(12) United States Patent
Kotaru et al.

(10) Patent No.: US 12,389,052 B2
(45) Date of Patent: *Aug. 12, 2025

(54) SYSTEMS AND METHODS FOR ENHANCED MULTIMEDIA SIGNAL BROADCAST, RECEPTION, DATA DELIVERY, AND DATA COLLECTION

(71) Applicants: Board of Trustees of Michigan State University, East Lansing, MI (US); Chandra Kotaru, San Jose, CA (US)

(72) Inventors: Chandra Kotaru, San Jose, CA (US); Prabu David, East Lansing, MI (US); Susanne Elkins, East Lansing, MI (US)

(73) Assignee: Board of Trustees of Michigan State University, East Lansing, MI (US)

( * ) Notice: Subject to any disclaimer, the term of this patent is extended or adjusted under 35 U.S.C. 154(b) by 22 days.

This patent is subject to a terminal disclaimer.

(21) Appl. No.: 18/330,264

(22) Filed: Jun. 6, 2023

(65) Prior Publication Data

US 2024/0089517 A1 Mar. 14, 2024

Related U.S. Application Data

(63) Continuation of application No. 17/790,693, filed as application No. PCT/US2021/012122 on Jan. 4, 2021, now Pat. No. 11,671,635.

(Continued)

(51) Int. Cl.
*H04N 21/2343* (2011.01)
*H04N 21/438* (2011.01)
*H04N 21/61* (2011.01)

(52) U.S. Cl.
CPC . *H04N 21/234309* (2013.01); *H04N 21/4382* (2013.01); *H04N 21/6106* (2013.01)

(58) Field of Classification Search
CPC ....... H04N 21/234309; H04N 21/4382; H04N 21/6106
See application file for complete search history.

(56) References Cited

U.S. PATENT DOCUMENTS 6,407,998 B1 * 6/2002 Polit .................. H04N 21/4622
370/395.42
6,557,031 B1 * 4/2003 Mimura ................ H04L 69/085
709/236

(Continued)

FOREIGN PATENT DOCUMENTS

CA 2686275 A1 5/2007
CA 27 46186 A1 6/2010

(Continued)

OTHER PUBLICATIONS

Park et al., "Delivery of ATSC 3.0 Services With MPEG Media Transport Standard Considering Redistribution in MPEG-2 TS Format", IEEE, vol. 62, No. 1, Mar. 2016, pp. 338-351.

(Continued)

*Primary Examiner* — James R Sheleheda
(74) *Attorney, Agent, or Firm* — QUARLES & BRADY LLP

(57) ABSTRACT

New systems and methods allow for transmission of multiple types of content protocols over a unidirectional content delivery network, such as a television broadcast. Hardware and/or software used at the network transmission location (such as a television broadcast station) and hardware and/or software located at an endpoint (such as a home television, car infotainment system, or first responder location) allow for a native ATSC 1.0 signal to have embedded within it additional content that is not encoded as ATSC 1.0 content. The non-ATSC 1.0 content can be detected and segregated from ATSC 1.0 content so that the endpoint devices (such as a television receiver) will not attempt to render the non- (Continued)

ATSC 1.0 content (such as, e.g., ATSC 3.0 content or application specific content) as normal ATSC 1.0 programming. Instead, the non-ATSC 1.0 content will be separately decoded, assembled, and processed to allow for multiple types of content to be used and displayed by the endpoint, even though the broadcast signal was transmitted only.

14 Claims, 13 Drawing Sheets

Related U.S. Application Data

(60) Provisional application No. 62/956,519, filed on Jan. 2, 2020.

(56) References Cited

U.S. PATENT DOCUMENTS

| | | | |
|---|---|---|---|
| 6,724,327 B1* | 4/2004 | Pope | H03M 13/00 |
| | | | 341/67 |
| 6,744,789 B1* | 6/2004 | Michener | H04N 21/23608 |
| | | | 375/E7.022 |
| 7,284,261 B1* | 10/2007 | Connelly | H04N 21/235 |
| | | | 725/140 |
| 7,532,672 B2* | 5/2009 | Rao | G10L 19/24 |
| | | | 375/259 |
| 9,060,180 B2* | 6/2015 | Gish | H04N 19/61 |
| 11,019,404 B2* | 5/2021 | Feldman | H04N 21/25808 |
| 1,158,229 A1 | 10/2021 | Lim | |
| 11,272,247 B2* | 3/2022 | Menon | H04N 21/44004 |
| 11,671,635 B2* | 6/2023 | Kotaru | H04N 21/6106 |
| | | | 709/231 |
| 2003/0174837 A1* | 9/2003 | Candelore | H04N 21/26606 |
| | | | 380/210 |
| 2006/0256862 A1* | 11/2006 | Rao | G10L 19/24 |
| | | | 375/240.08 |
| 2007/0022088 A1* | 1/2007 | You | G11B 20/00449 |
| 2007/0074240 A1* | 3/2007 | Addington | H04N 21/26606 |
| | | | 725/25 |
| 2008/0005639 A1* | 1/2008 | Frederiksen | H04L 1/1829 |
| | | | 714/751 |
| 2012/0314773 A1 | 12/2012 | Gish et al. | |
| 2016/0164943 A1* | 6/2016 | Walker | H04L 65/752 |
| | | | 709/219 |
| 2018/0139495 A1* | 5/2018 | Eyer | H04N 21/4383 |
| 2018/0206001 A1* | 7/2018 | Kim | H04N 21/42204 |
| 2020/0169775 A1 | 5/2020 | Clift | |
| 2021/0258092 A1 | 8/2021 | Kwak | |
| 2021/0409816 A1 | 12/2021 | Menon | |
| 2022/0121830 A1* | 4/2022 | Martinez | H03M 7/607 |
| 2023/0042613 A1* | 2/2023 | Kotaru | H04N 21/4382 |
| 2023/0275734 A1* | 8/2023 | Bai | H04L 1/1607 |
| | | | 370/329 |
| 2024/0089517 A1* | 3/2024 | Kotaru | H04N 21/234309 |

FOREIGN PATENT DOCUMENTS

| | | | | |
|---|---|---|---|---|
| CN | 115552914 A | * | 12/2022 | H04N 21/234309 |
| JP | 2018195972 A | | 12/2018 | |
| KR | 20200129486 A | | 11/2020 | |
| WO | WO-0203678 A2 | * | 1/2002 | H04L 1/0041 |
| WO | 2015178036 A1 | | 11/2015 | |
| WO | 2021101934 A1 | | 5/2021 | |
| WO | WO-2021138692 A3 | * | 8/2021 | H04N 21/234309 |
| WO | WO-2021262904 A1 | * | 12/2021 | H04N 21/4147 |

OTHER PUBLICATIONS

Chernock et al., "ATSC 3.0 Next Generation Digital TV Standard—An Overview and Preview of the Issue", IEEE, Mar. 2016, pp. 154-158.

International Search Report issued for PCT/US2021/012122 on Jul. 8, 2021.

* cited by examiner

TS Packet Structure without ATSC 3.0 data (320)

| Sync Byte | TEI | PUSI | TP | PID | TSC | AFC | CC | Payload |
|---|---|---|---|---|---|---|---|---|
| 8 bit | 1 bit | 1 bit | 1 bit | 13 bit | 2 bit | 2 bit | 2 bit | 184 bytes |

TS Packet Structure with ATSC 3.0 data (324)

| Sync Byte | TEI | PUSI | TP | PID | TSC | AFC | CC | PC | PL | Payload |
|---|---|---|---|---|---|---|---|---|---|---|
| 8 bit | 1 bit | 1 bit | 1 bit | 13 bit | 2 bit | 2 bit | 2 bit | 8 bit | 8 bit | 182 bytes |

TEI: Transport Error Indicator
PUSI: Payload Unit Start Indicator
TP: Transport Priority
PID: Packet Identifier
TSC: Transport Scrambling Control
AFC: Adaptation Field Control
CC: Continuity Counter PC: Payload Counter
PL: Payload Length

FIG. 5B

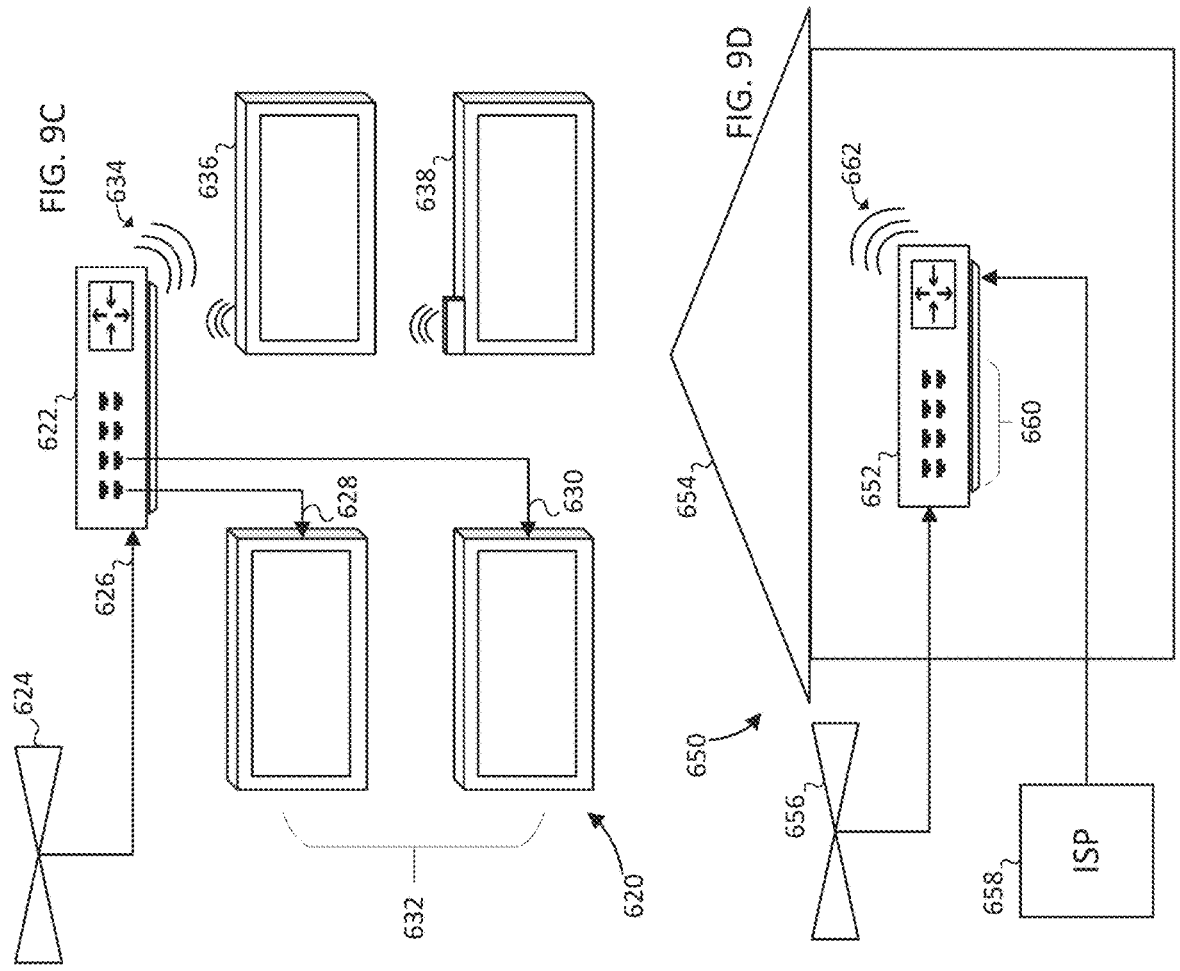
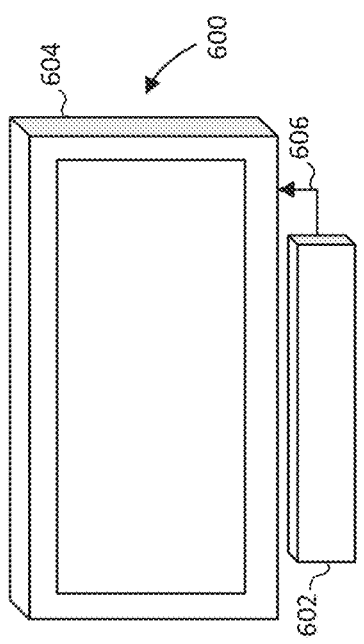
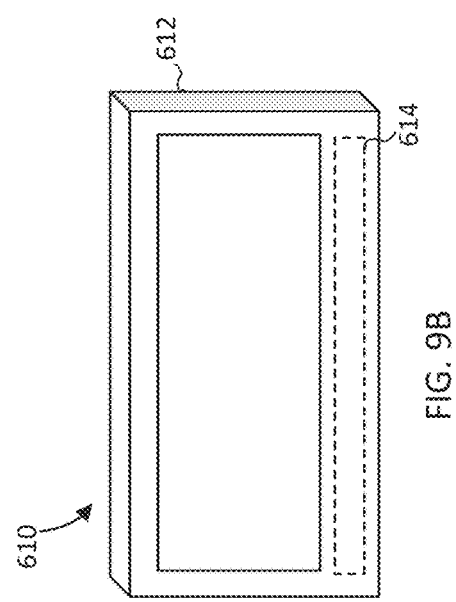

SYSTEMS AND METHODS FOR ENHANCED MULTIMEDIA SIGNAL BROADCAST, RECEPTION, DATA DELIVERY, AND DATA COLLECTION

CROSS-REFERENCE TO RELATED APPLICATIONS

This application is a continuation application of U.S. application Ser. No. 17/790,693, which is a national stage filing under 35 U.S.C. §371 of International Application No. PCT/US2021/012122, filed Jan. 4 2021. which claims priority to U.S. Provisional Application No. 62/956,519, filed on Jan. 2, 2020, the contents of each of which are hereby incorporated by reference in their entirety.

BACKGROUND

ATSC 3.0 is a next generation television broadcast standard that could be implemented to replace the existing, widely-used ATSC 1.0 standard, providing expanded functions and interactivity. The ATSC 3.0 standard could allow for the convergence of the broadcasting and broadband/internet worlds to offer rich hybrid services along with a wide variety of capabilities such as 4K Video, immersive audio, interactive apps, advanced audio/video compression, robust modulation, single frequency transmission systems to overcome physical barriers for signal reception on devices such as TVs, phones, tablets, car dashboards etc.

Currently, the ATSC 3.0 standard is seen as backwards incompatible with equipment running the ATSC 1.0 standard. In other words, given the current state of the art, in order for a broadcaster to start broadcasting ATSC 3.0 content, the broadcaster would need to replace its ATSC 1.0 transmission equipment and systems with new equipment and systems that operate on the ATSC 3.0 standard.

Referring now to FIG. 1, a simplified representation of a typical system 10 for transmitting and receiving ATSC 1.0 content is shown. The system 10 includes an ATSC 1.0 encoder 12 that receives television A/V content encodes the content into an ATSC 1.0 Multi Program Transport Stream (MPTS) formatted signal 14, which is then supplied to an ATSC 1.0 exciter (e.g., a transmission tower) 16 included in the system 10. The ATSC 1.0 exciter 16 broadcasts an RF transmission onto which the ATSC 1.0 MPTS 14 is encoded. A typical RF transmission for an ATSC 1.0 broadcast is generally limited to a 6 Mhz channel by the FCC, and given the way the ATSC 1.0 protocol formats data the content that can be encoded onto that bandwidth is approximately 19.49 Mb/s (or about 2 HDTV channels and three SCTV channels).

As shown, the ATSC 1.0 RF signal is received by an ATSC 1.0 receiver device 20, which can include a television, antenna, set top box, or the like, and any necessary components to receive the broadcast transmission, convert the RF signal to digital information, decode the digital ATSC 1.0 signal 18, and extract any ATSC 1.0 content in the ATSC 1.0 RF signal 18, which may include one or more subchannels of content such as news, sports, weather, etc. The ATSC 1.0 receiver device 20 can then display the ATSC 1.0 content on a display 22 included in the ATSC 1.0 receiver device 20.

It is noted that only ATSC 1.0 is sent over the broadcast transmission, and only ATSC 1.0-compliant receiver devices (e.g., the ATSC 1.0 receiver device 20) can receive and decode the ATSC 1.0 RF signal 18. A receiver device that would be ATSC 3.0-compliant (of which, presently, there are limited or no such devices available to the public in most regions, as all or essentially all television broadcasts are done via ATSC 1.0 transmissions) would not be able to receive and decode the ATSC 1.0 RF signal 18, as the encoding and broadcast protocols differ as between the ATSC 1.0 and ATSC 3.0. For example, ATSC 1.0 content has a specific packetization protocol (with specific header/metadata information and formatting) and the content inside such packets are typically based on the MPEG-2 (H.262) specifications (a 188-byte MPEG transport stream packetization) for video and Dolby AC-3 for audio. The packets are typically broadcast using 8VSB modulation, with a specific "transport stream" media container format for the packets. This standard is designed specifically for lossy broadcast, which is the case in terrestrial over-the-air television broadcasts.

In contrast, ATSC 3.0 on the other hand uses MPEG-DASH or MPEG Media Transport (MMT) packaging for video content with High Encoding Video Compression or HEVC (H.265), and Dolby AC-4 support for the audio in the US market. Unlike ATSC 1.0, which in some standard implementations can have a maximum throughput of 19.4 Mbps, typical ATSC 3.0 implementations often have maximum throughputs of up to about 56 Mbps with suitable modulation. Because of this and other attributes, ATSC 3.0 broadcast formatting can be leveraged (as described below) to provide robust signals to mobile devices such as phones, tablets, car dashboards, etc. as well as televisions. Furthermore, ATSC 3.0 provides for UltraHD 4K resolution quality, while the ATSC 1.0 can at best support Full HD (i.e., 1080p). ATSC 3.0 transmissions can be broadcast on the same 6 MHz frequency channel as ATSC 1.0 transmissions, but by using Orthogonal Frequency Division Multiplexing (OFDM) instead of 8VSB modulation, ATSC 3.0 can provide up to about three times the data rate of ATSC 1.0.

At the receiver-side, a specific demodulation and error correction are applied to the data, followed by an ATSC 1.0-specific demultiplexing of the packets. Additionally, due to these standards, packetization protocols, and A/V protocols, ATSC 1.0 is limited in terms of its broadcast bit rate and video playback bit rate.

Thus, at present broadcasters cannot broadcast to both ATSC 1.0 receiver devices and ATSC 3.0 receiver devices with a single ATSC 1.0 exciter 16, and broadcasters cannot send ATSC 3.0 A/V content to an ATSC 1.0 receiver device, or vice versa.

As mentioned above, in order for a broadcaster to start broadcasting ATSC 3.0 content, the broadcaster currently needs to replace its ATSC 1.0 transmission equipment and systems with new equipment and systems that operate on the ATSC 3.0 standard. Replacing the ATSC 1.0 transmission equipment, in particular an exciter (e.g., the ATSC 1.0 exciter 16) encoder and the like, can be expensive. In addition to considering the cost of replacing the ATSC 1.0 transmission equipment, the broadcaster would also need to consider how many current viewers having only ATSC 1.0 receivers would be lost if the station changed over to broadcasting ATSC 3.0 content. Furthermore, if the broadcaster retains the current ATSC 1.0 equipment, the broadcaster could lose potential customers with ATSC 3.0 receiver devices who may choose to view ATSC 3.0 content broadcast by other broadcasters. And, given FCC-mandated bandwidth allocations for each broadcaster, it is not practicable for broadcasters to attempt to send both ATSC 1.0 and ATSC 3.0 transmissions at the same time within the same band.

SUMMARY

The present disclosure describes multiple embodiments, techniques, features and advantages that overcome the disadvantages of the prior art.

For example, a method is provided for transmitting enhanced multimedia signals. The method comprises receiving multimedia content, comprising a plurality of advanced television systems committee (ATSC) 3.0 packets; generating a modified ATSC 1.0 transport stream that includes a plurality of ATSC 1.0 packets, wherein each of the plurality of modified ATSC 1.0 packets comprises: at least a portion of an ATSC 3.0 packet of the plurality of ATSC 3.0 packets; and an indicator that the modified ATSC 1.0 packet is not to be rendered as ATSC 1.0 content; injecting at least one of the modified ATSC 1.0 packets into an ATSC 1.0 multi-program transport stream (MPTS); and broadcasting the ATSC 1.0 MPTS.

As another example, a method is provided for receiving enhanced multimedia signals. The method comprises: receiving, at a hardware device, an advanced television systems committee (ATSC) 1.0 broadcast comprising a plurality of ATSC 1.0 packets; determining for each of the plurality of ATSC 1.0 packets whether the respective ATSC 1.0 packet is to be rendered as ATSC 1.0 content; identifying a plurality of modified ATSC 1.0 packets included in the broadcast that are not to be rendered as ATSC 1.0 content, wherein each of the plurality of modified ATSC 1.0 packets comprises: at least a portion of a packet representing non-ATSC 1.0 content; and an indicator that the modified ATSC 1.0 packet is not to be rendered as ATSC 1.0 content; converting at least a portion of the plurality of modified ATSC 1.0 packets to a signal comprising non-ATSC 1.0 content; and cause the non-ATSC 1.0 content to be rendered upon user request.

The various methods described herein can be implemented via a number of systems and hardware configurations. For example, a television transmission system is provided that comprises a receiver and a processor. The receiver is configured to receive a first type of television content and a second type of television content. The processor is connected to a memory, the memory having stored thereon a set of instructions which, when executed by the processor, cause the processor to: generate a transmission signal according to a protocol of the first type of television content; using an opportunistic scheduling scheme, locating available payload space within the transmission signal prior to transmission; and reformatting the second type of television content into packets of the protocol of the first type of television content, and inserting the reformatted packets into the available payload space within the transmission signal; and a transmitter connected to receive and broadcast the transmission signal via a television band.

As another example, a receiver is provided that comprises an input, an output, and a processor. The input may be connected to receive a television broadcast signal. The output is configured to be connected to a display. The processor is connected to receive the television broadcast signal from the input, and further connected to a memory having stored thereon a set of software instructions which, when executed by the processor, cause the processor to: digitize the television broadcast signal into packets; determine whether each packet contains an indicator of a television content type not native to the television broadcast signal; if such an indicator is not present, process the packet using a first decoding scheme for rendering as the native television content type; if such an indicator is present for a packet, process the packet using a second decoding scheme for rendering as a second television content type; and present the native television content and second television content type to the output for display as television channels.

BRIEF DESCRIPTION OF THE DRAWINGS

FIG. 5B shows an exemplary ATSC 1.0 packet and a modified ATSC 1.0 packet.

FIG. 9A-D show series of configurations and architectures for implementation of equipment providing enhanced ATSC broadcast communications to users.

DETAILED DESCRIPTION

Various systems and methods are disclosed herein for overcoming the disadvantages and limitations of existing approaches. Aspects of the present invention allow for new capabilities and blended content transmissions in what would otherwise be a conventionally forward-incompatible ATSC 1.0 broadcast system. Furthermore, aspects of the invention provide backwards-compatible capabilities at a fraction of the cost of setting up entire ATSC 3.0 transmitter systems and a fraction of the effort needed to seed the market with ATSC 3.0 receiver systems. Broadcasters can leverage their existing ATSC 1.0 systems with the modifications of the systems and methods described herein while benefiting from the advantages of the ATSC 3.0 standard.

Figure 1:
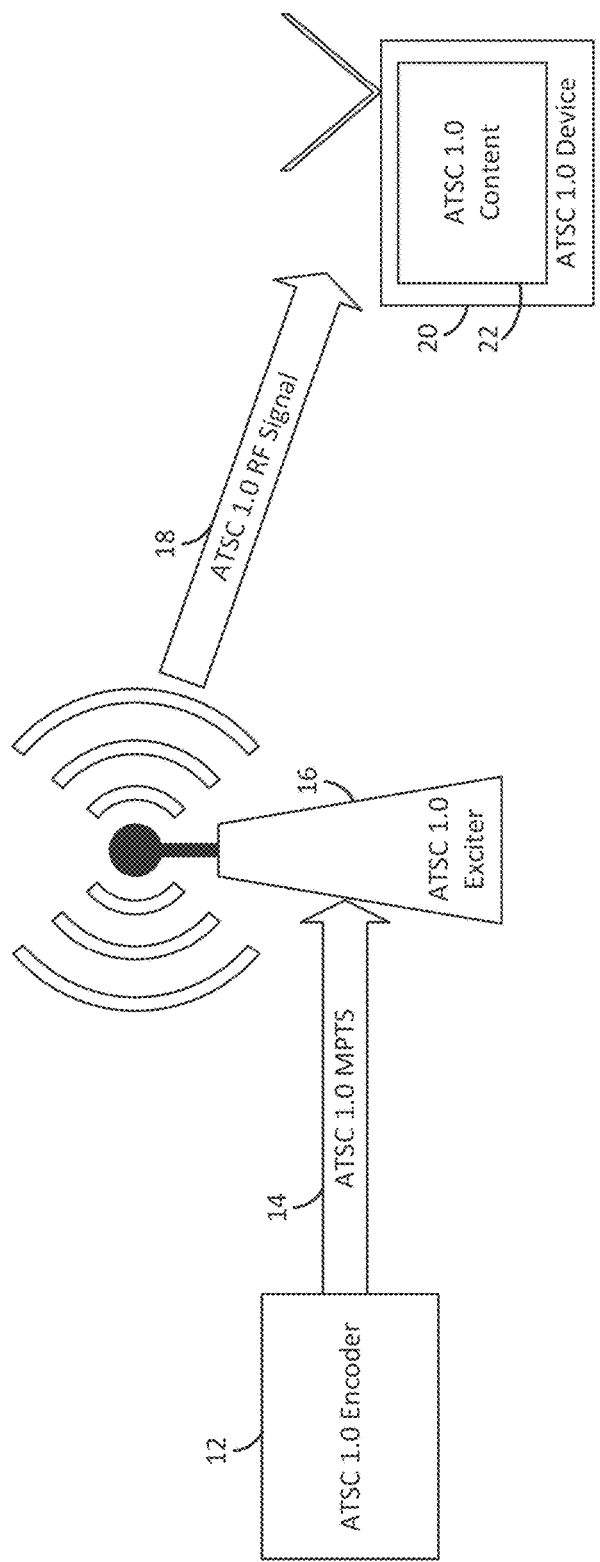
FIG. 1 shows an example of an ATSC 1.0 transmission infrastructure.
Figure 2:
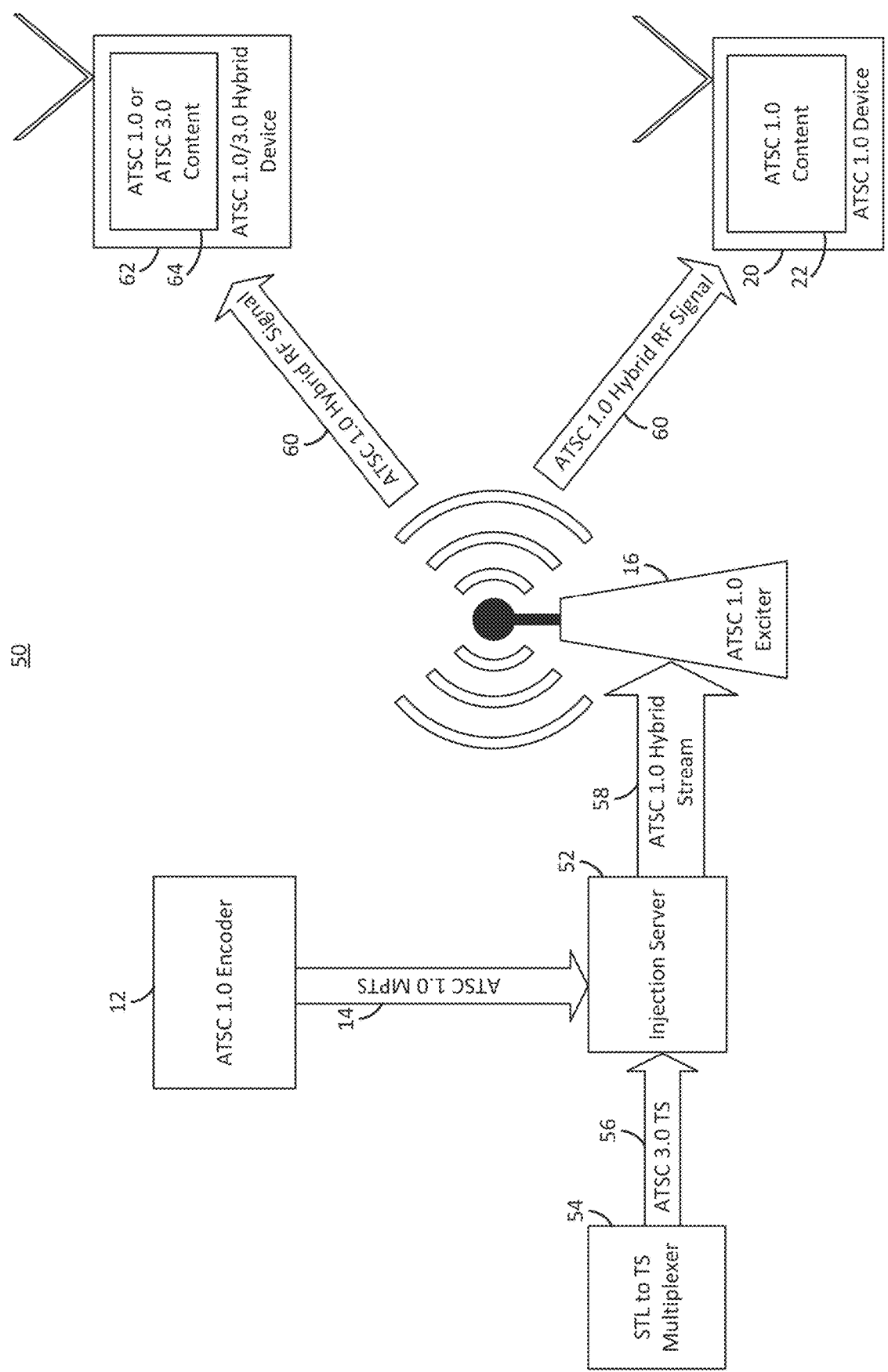
FIG. 2 shows an example of a system for transmitting and receiving both ATSC 1.0 and ATSC 3.0 content on a single ATSC 1.0 broadcast transmission.

Referring now to FIG. 2, a new architecture 50 for transmitting and receiving both ATSC 1.0 and ATSC 3.0 content on a single ATSC 1.0-based broadcast signal is shown. The architecture can be thought of as comprising a broadcasting system and multiple receiving systems The broadcasting system 50 can include an injection server that can receive an ATSC 1.0-style MPTS stream 14 (which could be, e.g., the same or a similar transport stream as in FIG. 1) as well as an ATSC 3.0 transport stream (TS) 56. The injection server 52 reformats the streams, multiplexes them, and inserts both streams into a single ATSC 1.0 hybrid stream 58. Details of the operation of the injection server are included below.

The injection server 52 can receive the ATSC 3.0 TS stream 56 from a suitable source, such as from an external IP-based connection or a local STL to TS multiplexer 54 included in the system. The injection server 52 can first reformat packets of content data and metadata from the ATSC 3.0 TS stream 56 into ATSC 1.0 packets, and then dynamically insert the reformatted packets into "empty" points, or null space in the bandwidth, of the ATSC 1.0 MPTS stream 14 (i.e., in place of what would otherwise have been null packets).

In one embodiment, the injection server 52 can ensure that, for each reformatted ATSC 3.0 packet, the packets contain headers, flags, and metadata that conform to ATSC 1.0 norms and/or the ISO 13818-1 standard. If not, the server 52 can add such formatting and information to each packet. The server 52 can set the "transport private data" flag (which is an optional setting in ATSC 1.0 protocols, and can be adapted for use in systems and methods described herein) to be high (i.e., set the flag to be one) and then include ATSC 3.0 TS data within the packet. Thus, the broadcaster will know that most conventionally-configured ATSC 1.0 receivers will not attempt to process the content of the packet for display to a consumer. By design, a conventional ATSC 1.0 receiver is programmed not to process the content of a "transport private data" packet for display. Additionally, the transport data length field of the reformatted ATSC 3.0 packet can, in some embodiments, be set based on the size of the ATSC 3.0 data within the packet. Hybrid receiver devices, such as ATSC 1.0/3.0 hybrid receiver device 62 described below, can have software stored in onboard memory that causes the receiver to extract ATSC 3.0 data from a private data packet received in an ATSC 1.0 RF transmission, separately decode the content of that packet, and then use the content to generate separate, non-ATSC 1.0 content such as playing back ATSC 3.0 content. The ATSC 1.0 packets already present in the ATSC 1.0 MPTS 14 can remain unmodified (i.e., native format). The injection server 52 can then output the ATSC 1.0 hybrid stream, which can include the native ATSC 1.0 packets from the ATSC 1.0 MPTS 14 as well as the dynamically inserted, reformatted packets containing the ATSC 3.0 data from the ATSC 3.0 TS 56.

The new broadcast system 50 can include the same ATSC 1.0 exciter 16 as the prior art system 10, as well as many other components of the system 50 (including all of the components that provided for the ATSC 1.0 MPTS 14 to be sent to the exciter 16. The equipment added is the injection server. In this way, broadcasters can achieve greater efficiency and continuity by not having to replace their current exciters in order to broadcast ATSC 3.0 content. The ATSC 1.0 exciter 16 can output the ATSC 1.0 hybrid stream 58 as an ATSC 1.0 hybrid RF signal 60. In fact, a broadcaster that was broadcasting, e.g., 3 subchannels of ATSC 1.0 content could continue broadcasting those subchannels uninterrupted but then also broadcast ATSC 3.0 content.

The exciter 16 can broadcast an ATSC 1.0 hybrid RF signal 60 to the same ATSC 1.0 receiver device 20 as the prior art system 10. The ATSC 1.0 receiver device 20 can receive and decode the ATSC 1.0 hybrid RF signal 60, and more specifically the native ATSC 1.0 packets. The ATSC 1.0 receiver device 20 will not attempt to decode the ATSC 1.0 packets containing the ATSC 3.0 data because the transport private data flag is set high for those packets. The receiver device 20 will only decode and display content from the native ATSC 1.0 packets. In this way, the system 50 can broadcast content to already existing ATSC 1.0 devices without any changes from the consumer side (e.g., purchasing a new receiver device such as a television). The consumer may also not be able to perceive any difference in programming (e.g., the subchannel number of a news subchannel may stay the same).

At the same time, the broadcast transmission from the exciter 16 containing the ATSC 1.0 hybrid RF signal 60 may also be received by a new ATSC 1.0/3.0 hybrid receiver device 62. In one embodiment, this device 62 may include a display 64, or it may be a standalone receiver (e.g., as in a cable set-top box). The ATSC 1.0/3.0 hybrid receiver device 62 can decode and process both the ATSC 1.0 content and the ATSC 3.0 content from the ATSC 1.0 hybrid RF signal 60. The ATSC 1.0/3.0 hybrid receiver device 62 can decode native ATSC 1.0 packets in similar fashion as the ATSC 1.0 receiver device 20. Additionally, the ATSC 1.0/3.0 hybrid receiver device 62 can include additional hardware components, applications, firmware, etc. that can process the ATSC 1.0 packets containing the ATSC 3.0 data. The ATSC 1.0/3.0 hybrid receiver device 62 can detect packets containing ATSC 3.0 data based on the position of the transport private data flag. When the transport data flag is high on a given packet, the ATSC 1.0/3.0 hybrid receiver device 62 can then execute a routine that determines whether the packet contains ATSC 3.0 content (or is, e.g., governmental or public emergency information that may normally be sent in such packets). In one embodiment, the routine detects the type of content in the packet, the packet length, or other metadata of the packet to determine the contents are ATSC 3.0 data. The device 62 can then extract the ATSC 3.0 data based on a predetermined fashion, which will be described below. The ATSC 1.0/3.0 hybrid receiver device 62 can then display the ATSC 1.0 content and/or the ATSC 3.0 content based on user preference.

In some embodiments, the ATSC 1.0/3.0 hybrid receiver device 62 can be a native ATSC 1.0 receiver device (otherwise thought of as incompatible with ATSC 3.0 content) that includes a receiver antenna and other equipment configured to normally receive ATSC 1.0 content (e.g., bitstream rates, bandwidth, error-checking, etc. that are customary to ATSC 1.0) and that also includes an application to decode the ATSC 3.0 content from the ATSC 1.0 hybrid RF signal 60. Thus, in some embodiments, the ATSC 1.0/3.0 hybrid receiver device 62 can be made by taking an already existing ATSC 1.0 receiver device (e.g., the ATSC 1.0 receiver device 20) and downloading an application (e.g., from an app store) or a firmware patch configured to decode the ATSC 1.0 packets containing the ATSC 3.0 data. In this way, a ATSC 1.0 receiver device with sufficient hardware can be turned into a ATSC 1.0/3.0 hybrid receiver device by simply downloading and installing the application or patch.

In some embodiments, an external set-top box including sufficient hardware and software to decode both ATSC 1.0 content and ATSC 3.0 content from the ATSC 1.0 hybrid RF signal 60 can be connected to an already existing ATSC 1.0 receiver device (e.g., the ATSC 1.0 receiver device 20) to form the ATSC 1.0/3.0 hybrid receiver device 62. Thus, a consumer may be able to create the ATSC 1.0/3.0 hybrid receiver device 62 with a relatively small cost as compared to buying an additional ATSC 1.0/3.0 hybrid receiver device. More specifically, the cost of the set-top box may be significantly smaller than the cost of an entire ATSC 1.0/3.0 hybrid receiver device, which can include a television that may cost more than the set-top box.

The new system 50 can be used to continue providing ATSC 1.0 content to existing ATSC 1.0 receiver devices, while simultaneously providing both ATSC 1.0 and ATSC 3.0 content to certain receiver devices such as the ATSC 1.0/3.0 hybrid receiver device 62. Furthermore, it is appreciated that the system 50 can implemented while retaining at least a portion of the existing infrastructure on both the broadcast side and the consumer side. A broadcaster may only need to purchase the injection server 52, and may retain the already existing ATSC 1.0 exciter 16. A consumer may not need to purchase any new equipment if they do not desire to receive ATSC 3.0 content. The consumer may "opt-in" to receive ATSC 3.0 content by downloading and application to their ATSC 1.0 receiver device and/or purchasing a set-top box as described above.

Figure 3:
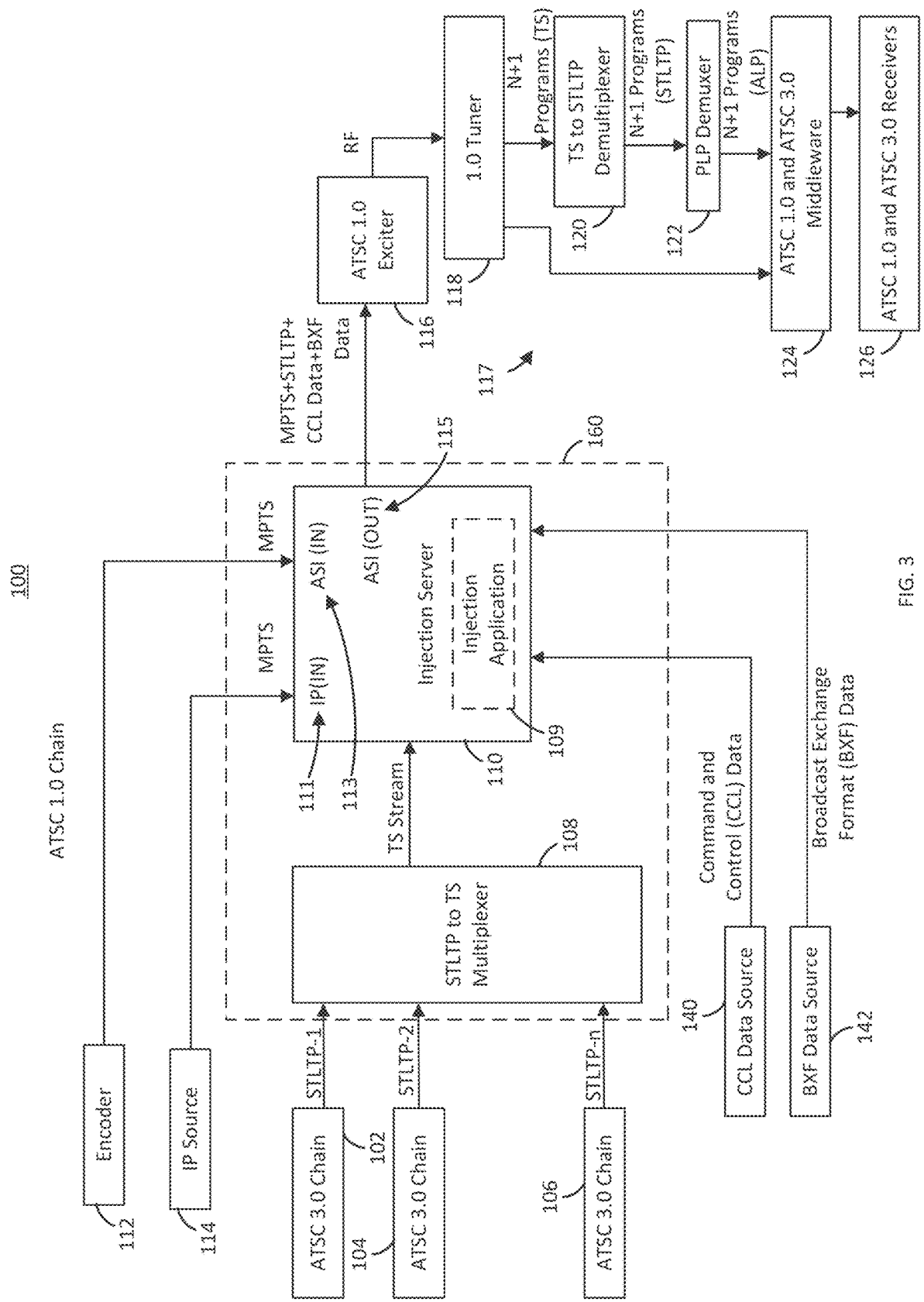
FIG. 3 shows an example of a system for generating, transmitting, and receiving an ATSC 3.0 stream over ATSC 1.0 transmission infrastructure, in accordance with certain embodiments disclosed herein.

Example Systems and Methods for Transmitting ATSC 3.0 Content on ATSC 1.0 Signal Transmission Referring now to FIG. 3, another example of a new system 100 for generating, transmitting, and receiving an ATSC 3.0 stream over an ATSC 1.0 transmission infrastructure is shown. The system 100 inserts ATSC 3.0 stream(s) in ATSC 1.0 Multi Program Transport Streams (MPTS), which have a total bandwidth of 19.4 Mbps. As with the system 50 in FIG. 3 described above, the system 100 enables for the transmission of an ATSC 3.0 stream over an industry-wide existing ATSC 1.0 transmission infrastructure to reach ATSC 1.0 tuners that already exist in the market.

The system 100 can include an encoder 112, an internet protocol (IP) source 114, ATSC 3.0 chains 102, 104, and 106, a Studio to Transmitter Link Tunneling Protocol (STLTP) to Transport Stream (TS) multiplexer 108, an injection server 110, an ATSC 1.0 Exciter 116, and a receiver stack 117. The multiplexer 108 may receive a number, 'n', of STLTP inputs from the ATSC 3.0 chains 102, 104, 106. The multiplexer 108 can generate and output a TS data stream to the injection server 110. The system 100 can also include a command and control (CCL) data source 140 and a broadcast exchange format (BXF) data source 142.

The multiplexer 108 may output a modified ATSC 1.0 TS data stream. Each of the ATSC 3.0 chains 102, 104, 106 can include ATSC 3.0 packets that include 1500 bytes of data. Because the ATSC 3.0 packets can be much larger than the payload of ATSC 1.0 packets, the multiplexer 108 can divide each ATSC 3.0 packet into a number of smaller packets that can be included as the payload in an ATSC 1.0 packet. In some embodiments, the multiplexer 108 can divide each ATSC 3.0 packet into nine portions. Each portion can then be inserted into the payload portion an ATSC 1.0 packet.

The multiplexer 108 can populate certain fields (e.g., PID) in each ATSC 1.0 packet with metadata associated with the ATSC 3.0 packet. The 108 multiplexer can also set a transport private data flag in each modified ATSC 1.0 packet high (e.g., "1"). The multiplexer 108 can also add certain metadata associated with the location of the ATSC 3.0 data within the original ATSC 3.0 packet to each modified ATSC 1.0 packet. For example, the metadata can include information that the portion of ATSC 3.0 data in the payload of a modified ATSC 1.0 packet is the third of nine total portions of the original ATSC 3.0 packet. An exemplary modified ATSC 1.0 packet will be described below. The multiplexer 108 can output the modified ATSC 1.0 TS data stream including modified ATSC 1.0 packets (that include native ATSC 3.0 data) associated with the ATSC 3.0 chains 102, 104, 106 to the injection server 110.

In some embodiments, the multiplexer 108 can be included in an injection server, such as injection server 160. In these embodiments, the injection server 160 can perform the functions of the injection server 110 as well as receive the ATSC 3.0 chains 102, 104, 106 and generate the ATSC 3.0 TS data stream. In some embodiments, the injection server 160 can be implemented as computer readable instructions on a computing device with suitable inputs and outputs (e.g., IP(IN), inputs to receive STLTP chains, ASI inputs, etc.).

The injection server 110 can include a number of inputs to receive data from various sources included in the system 100. The inputs may include ports such as physical interfaces. The injection server 100 may include a port that can receive the TS data stream from the multiplexer 108, a port that can receive an MPTS stream such as an ATSC 1.0 MPTS stream (e.g., from the encoder 112 or the IP source 114), a port that can receive command and control data, and a port that can receive BXF data. Exemplary hardware that can be used to implement the injection server 110 will be described below.

In some embodiments, the injection server 110 may include an IP input 111 that can be coupled to the IP source 114 and an asynchronous serial interface (ASI) input 113 that can be coupled to the encoder 112. In this way, the injection server 110 can receive an ATSC 1.0 MPTS stream from different sources. In other embodiments, the injection server 110 may include only one of the IP input 111 or the ASI input 113. ATSC 1.0 Multi Program Transport Stream (MPTS) signals may be generated by the IP source 114 and/or the encoder 112, and sent to the IP input 111 and/or ASI input 113 of the injection server 110.

The injection server 110 can also implement an injection application 109. The injection application 109 can receive data from the multiplexer 108, at least one of the encoder 112 or the IP source 114, the CCL data source 140, and the BXF data source 142, and output an ATSC 1.0 TS data stream including both ATSC 1.0 data and ATSC 3.0 data.

The injection server 110 and the multiplexer 108 have an in-memory communication channel.

In some embodiments, the injection server can receive the TS data stream from the multiplexer 108, the CCL data from the CCL data source 140, and the BXF data from the BXF data source 142, and insert ATSC 3.0 content into an ATSC 1.0 MPTS data stream received from either the encoder 112 and the IP source 114 based on the TS data stream, the CCL data, and the BXF data. With ATSC 3.0 content, certain metadata such as timing data can be inherently included in an ATSC 3.0 TS stream. To ensure this metadata is not lost when the TS data stream is inserted into packets in the ATSC 1.0 MPTS data stream, the injection server 110 can insert the CCL data and the BXF data alongside the TS data stream into ATSC 1.0 data packets. The injection server can then inject the data ATSC 1.0 data packets (that contain ATSC 3.0 data) into the ATSC 1.0 MPTS data stream to generate a modified ATSC 1.0 MPTS data stream.

The injection server 110 can output the modified ATSC 1.0 MPTS data stream to the ATSC 1.0 exciter 116. In this way, the ATSC 1.0 exciter 116 can continue broadcasting the same content to ATSC 1.0 receiver devices (e.g., the ATSC 1.0 receiver device in FIG. 1) as well as broadcast ATSC 3.0 content (e.g., the content in the ATSC 3.0 chains 102, 104, 106) to certain receiver devices, such as the ATSC 1.0/3.0 hybrid receiver device 62. More details of how the injection server 110 can inject ATSC 3.0 content into an ATSC 1.0 MPTS data stream will be described below.

The injection server 110 can output the modified ATSC 1.0 MPTS data stream (that includes ATSC 3.0 content) to the ATSC 1.0 exciter 116. The injection server 110 can be coupled to and in communication with the ATSC 1.0 exciter 116 over an ASI link or other suitable connection. In some embodiments, the injection server 110 can output the modified ATSC 1.0 MPTS data stream at an ASI output 115 to the ATSC 1.0 exciter 116.

The ATSC 1.0 exciter 116 may include an RF antenna or antenna array. The ATSC 1.0 exciter 116 can include a complementary input to receive data from the injection server 110. In some embodiments, the ATSC 1.0 exciter can include an ASI input that can be coupled to the ASI output 115 in order to receive the modified ATSC 1.0 data stream.

The ATSC 1.0 exciter 116 can output RF signals based on the modified ATSC 1.0 MPTS data stream. The RF signals may be received by an ATSC 1.0 tuner 118 included in the receiver stack 117.

The receiver stack 117 included in the system 100 further helps in assimilating the data received on demodulation by the ATSC 1.0 tuner 118. The receiver stack 117 can decode the ATSC 1.0 signal to retrieve the ATSC 3.0 stream(s) and the associated broadcaster application(s) if any, followed by playback of the content or invoking of the broadcaster application on interacting with receiver device. The receiver stack 117 can be included in a location that receives broadcast data from a station. For example, the receiver stack 117 can be included in a home or apartment. The receiver stack may include the ATSC 1.0 tuner 118, a TS to STLTP demultiplexer 120, a physical layer pipe (PLP) demultiplexer 122, ATSC 1.0/3.0 Middleware 124, and an ATSC 3.0 receiver 126.

In one embodiment, both ATSC 1.0 and ATSC 3.0 content can be transmitted over a given ATSC 1.0 transmission system. In an example of such a system 100, a given ATSC 1.0 signal may be created with a set of services that do not consume the entire bandwidth of the signal (e.g., the entire bandwidth being 19.4 Mbps for ATSC 1.0 signals). For example, the ATSC 1.0 services may take up only a portion of the bandwidth of a given ATSC 1.0 MPTS signal, with the remaining bandwidth being usable to carry ATSC 3.0 data. (In a true ATSC 1.0-only MPTS signal, null data packets may sometimes be inserted into unused bandwidth B, to serve as placeholders for any content that can be added on later.) For example, if the MPTS ATSC 1.0 signal has a service S1 (e.g., a subchannel) that is transmitted at a bit rate B1, a service S2 that is transmitted at a bit rate B2 (e.g., B1 and B2 being measured in Mbps) and so on, the available remaining bandwidth, B, in Mbps of a terrestrial television broadcast that can be used for reformatted packets of an ATSC 3.0 TS data stream (i.e., that can be inserted into the ATSC 1.0 MPTS signal) is as shown in EQ. 1 below.

$$B = 19.4 - \Sigma_1^n(BR1 + BR2 \ldots BRn) \quad \text{(EQ. 1)}$$

Knowing the available bandwidth B can be useful in a number of respects. First, it can help the broadcaster understand the types and amount of ATSC 3.0 content that can be included in the ATSC 1.0 transmission. For example, if B is a comparatively small number, then it may not be possible to send 4K quality video content in the reformatted ATSC 3.0 packets. Or, if B is a relatively larger number, then the broadcaster can plan to send more or larger content. Second, an injection server 50 of the present disclosure can use the value of B to prepare and plan how to multiplex packets onto the transmission.

In order to explain how they are multiplexed onto an ATSC 1.0 broadcast transmission, the generation of ATSC 3.0 signals should be addressed. ATSC 3.0 signals can be formatted as Studio to Transmitter Link Tunneling Protocol (STLTP) signals when generated from the ATSC 3.0 chain(s) 102, 104, 106. The input ATSC 3.0 signals are packetized into a TS data stream using the multiplexer 108, which is fed as one of the inputs to the injection server 110 coupled to the multiplexer 108.

In the present example, the ATSC 3.0 TS data stream output by the STLTP to TS multiplexer 108 may be added, by the injection server 110, to (e.g., inserted into or otherwise combined with) the ATSC 1.0 MPTS signal received at the IP input 111 or the ASI 113 input of the injection server 110.

The injection server 110 can also receive a CCL data signal and a BXF data signal. As described above, the CCL data and the BXF data can be used to retain essential metadata such as timing data for the ATSC 3.0 content. The CCL data signal can be formatted in JavaScript Object Notation (JSON) and provide details of artifact(s) that will be triggered in due course of time. The BXF data signal can be formatted in XML has and include key information on communication with broadcast chain components. Thus, the BXF data can include data for exchange between broadcast companies. Both CCL data and BXF data can be included within ATSC 3.0 TS packets. For example, the output signal may include the MPTS signal and the STLTP signal. As another example, the output signal may only include ATSC 3.0 programming by outputting the STLTP signal without the MPTS signal. In this way, the injection server 110 can provide ATSC 3.0 programming to appropriate receiver stacks using an ATSC 1.0 exciter (e.g., the ATSC exciter 116 included in the system 100).

Figure 4:
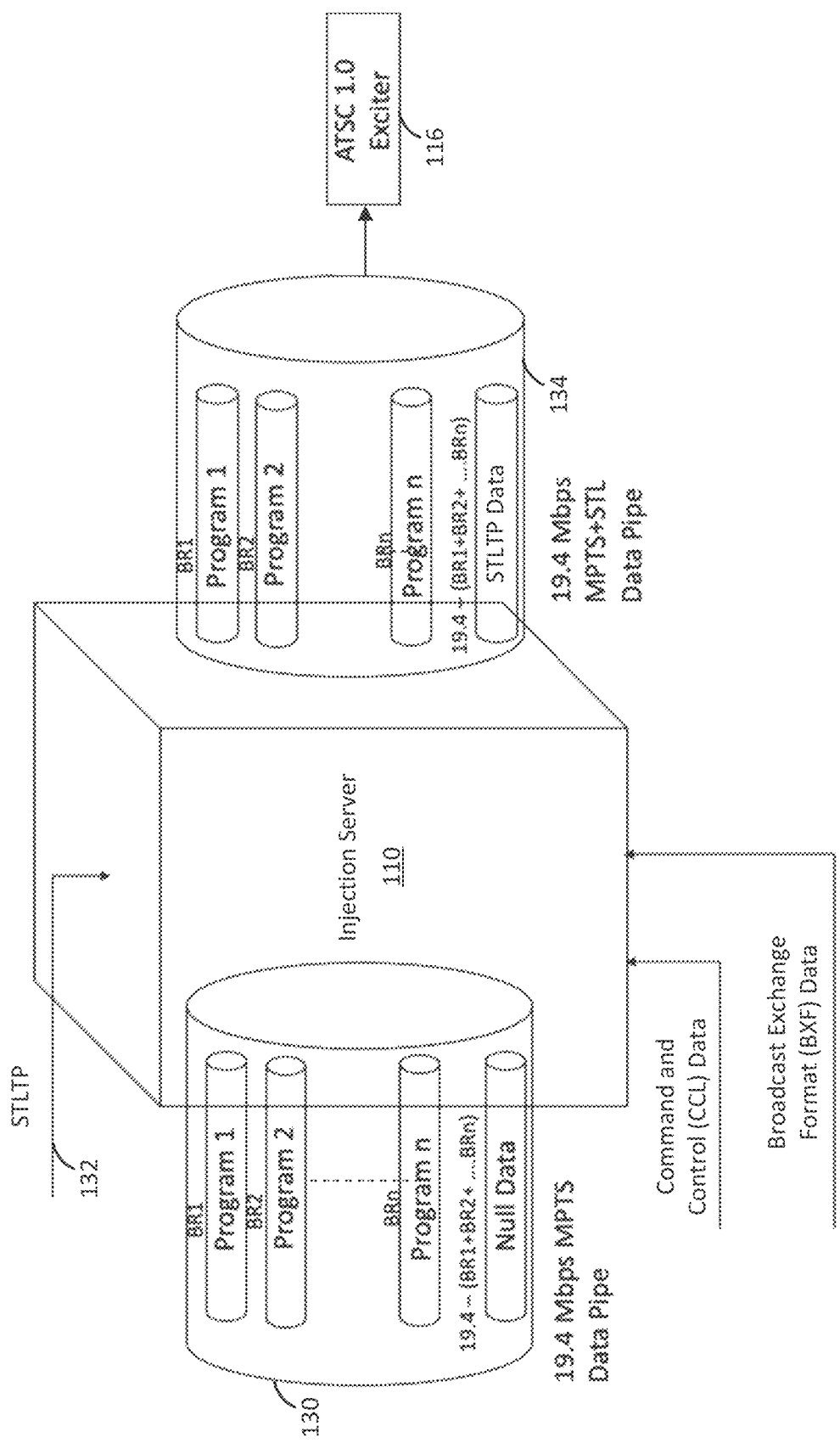
FIG. 4 shows an illustrative example of a data pipeline that may be utilized in certain systems disclosed herein.

The resultant output signal from the injection server 110 is the combination of MPTS, STLTP, CCL data, and BXF data as shown in FIG. 4. The output signal can be output at the ASI output 115 to the ATSC 1.0 exciter 116. The ATSC 1.0 exciter 116 can broadcast the output signal as an RF signal. In some embodiments, the injection server 110 be implemented by executing computer-readable instructions with one or more computer processors.

In some embodiments, the injection server 110 may output an ATSC 1.0 data stream that includes ATSC 3.0 content without any ATSC 1.0 content. The injection server 110 may only receive the TS stream from the multiplexer 108, the CCL data from the CCL data source 140, and the BXF data from the BXF data source 142 without receiving an ATSC 1.0 MPTS data stream (e.g., from the encoder 112 or the IP source 114). Alternatively, the injection server 110 may receive an ATSC 1.0 MPTS data stream but not use any of the packets in the ATSC 1.0 MPTS data stream. The injection server 110 may generate a new ATSC 1.0 MPTS data stream that includes packets that include ATSC 3.0 content from the multiplexer 108 as well as any necessary metadata included in the CCL data and the BXF data. In this way, the injection server 110 can provide a variety of ATSC 3.0 content over an ATSC 1.0 RF transmission.

Furthermore, a broadcaster may reformat current ATSC 1.0 content as ATSC 3.0 content, which may use up to seventy-five percent fewer bits than if the content was in the original ATSC 1.0 format. In this way, a broadcaster can continue providing current programming to users more efficiently. The reduction in bits can also allow the broadcaster to broadcast more content (e.g., more sub-channels) using the exciter 116 that is already being used.

Referring now to FIG. 3 as well as FIG. 4, the injection server 110 can receive a 19.4 Mbps MPTS data signal 130 (e.g., from the IP source 114 or the encoder 112) and an STLTP signal 132 (e.g., via the TS data stream output by the multiplexer 108). The output signal produced by the injection server 110 can be a 19.4 Mbps MPTS+STLTP data signal 134, which may be provided to the ATSC 1.0 exciter 116.

Returning to the receiver stack 117, the ATSC 1.0 tuner 118 can receive the RF signal (e.g., having a waveform corresponding to that of the signal 134 output by the injection server 110) transmitted by the ATSC 1.0 exciter. By receiving the RE signal, the ATSC 1.0 tuner 118 can receive both the ATSC 1.0 MPTS data and ATSC 3.0 data. The RF signal can include information related to the ATSC 1.0 MPTS data and/or the ATSC 3.0 data, and may also include information related to the CCL data and/or the BXF data.

The ATSC 1.0 tuner 118 can decode the RF signal to produce a TS signal. The TS signal may include at least a portion of the modified ATSC 1.0 MPTS data stream output by the injection server 110 to the ATSC 1.0 exciter 116 (e.g., at the ASI output 115). Certain packets in the TS signal output by the ATSC 1.0 tuner 118 may include errors and therefore require error correction.

Native ATSC 1.0 receiver devices, such as the ATSC 1.0 receiver device 20 in FIG. 1, can include the ATSC 1.0 tuner 118. The ATSC 1.0 receiver devices will only process packets in the TS signal that include ATSC 1.0 data because packets with ATSC 3.0 data can be marked by setting a transport private data flag high. In other words, the ATSC 1.0 receiver devices can receive the RF signal from the ATSC 1.0 exciter 116, generate the TS signal using an ATSC 1.0 tuner (e.g., the ATSC 1.0 tuner in FIG. 3), and process appropriate ATSC 1.0 packets in the TS signal without any additional hardware or software components.

Referring back to the receiver stack 117, the ATSC 1.0 tuner 118 can transmit the TS signal to the TS to STLTP demultiplexer 120. The TS to STLTP demultiplexer 120 can generate and output any number of STLTP chains based on how many sub-channels are included in the TS signal. For example, if the TS signal includes one ATSC 1.0 sub-channel and two ATSC 3.0 sub-channels, the TS to STLTP demultiplexer 120 can output three STLTP chains. The TS to STLTP demultiplexer 120 can identify which packets in the TS signal are ATSC 1.0 packets and which packets are ATSC 3.0 packets, and process the packets accordingly. In some embodiments, the ATSC 1.0 tuner 118 can transmit ATSC 1.0 packets in the TS signal to the ATSC 1.0/3.0 Middleware 124. The ATSC 1.0/3.0 Middleware 124 can then process the ATSC 1.0 packets using standard ATSC 1.0 protocols.

To generate one or more STLTP chains for one or more ATSC 1.0 sub-channels, the TS to STLTP demultiplexer 120 can identify a packet as being ATSC 1.0 by determining that the transport private data flag is low (i.e., zero), determine which sub-channel the packet is associated with based on information in the header of the packet, and decode the payload of the packet in accordance with ATSC 1.0 protocol. The TS to STLTP demultiplexer 120 can then output the decoded payload. In one embodiment, when mixed 1.0 and 3.0 content is sent over a single broadcast transmission, a separate buffering scheme may be used for the 3.0 content compared to the various subchannels of 1.0 content. In some applications, more than one subchannel of ATSC 3.0 content may be sent within the ATSC 1.0 broadcast, such that there may be buffers for each 1.0 subchannel stream (based upon flags or header data in ATSC 1.0 packets) and multiple buffers for ATSC 3.0 subchannels (based upon information decoded form the payload of a private data packet).

To generate one or more STLTP chains for one or more ATSC 3.0 sub-channels, the TS to STLTP demultiplexer 120 may identify a packet as being ATSC 3.0 by determining that the transport private data flag is high (i.e., one), determine which sub-channel the packet is associated with based on information in the header of the packet, and decode the payload of the packet using a predetermined set of rules that will be discussed further below. Essentially, the TS to STLTP demultiplexer 120 can decode ATSC 3.0 data in the transport stream packet payload based on the ATSC 3.0 data as well as CCL data and BXF data which may be included in the header and/or in the transport private data payload. The TS to STLTP demultiplexer 120 can output the decoded ATSC 3.0 data to a STLTP signal buffer for each sub-channel.

In some embodiments, the TS to STLTP demultiplexer 120 may only process ATSC 3.0 packets included in the TS stream, while ignoring any ATSC 1.0 packets. The ATSC 1.0 tuner 118 can transmit the TS signal to an ATSC 1.0 TS to MPTS demultiplexer (not shown) that can be included in the receiver stack 117.

The TS to STLTP demultiplexer 120 output the STLTP signals (e.g., from the buffers) to the PLP demultiplexer 122. The PLP demultiplexer 122 can convert the STLTP signal(s) into one or more ATSC Link-Layer Protocol (ALP) signals that are compatible with (i.e., can be read by) the ATSC 1.0/3.0 Middleware 124. In some embodiments, the ATSC 1.0/3.0 Middleware 124 can be included in the ATSC 3.0 receiver 126. The ATSC 3.0 receiver 126 can process the ALP signal and can, for example, play back content, invoke broadcaster applications, and/or leverage received data over the air based on the ALP signal.

The system 100 may allow broadcasters to avoid needing to invest in upgrading their existing ATSC 1.0 compliant infrastructure to ATSC 3.0 complaint infrastructure to test or offer sample service to their customers. All of the advantages of ATSC 3.0—from advanced compression, broadcaster application interactivity, robust modulation etc. —can be realized using the system 100. Broadcasters may only need to add portions of the system 100 into their broadcast chains in order to add ATSC 3.0 compatibility to existing systems. For example, only the ATSC 3.0 chains 102, 104, 106, the injection server 110, the STLTP to TS multiplexer 108, the TS to STLTP demultiplexer 120, the PLP demultiplexer 122, the ATSC 1.0/3.0 Middleware 124, and the ATSC 3.0 receiver 126 may need to be added to existing broadcast chains, as these broadcast chains may already include the ATSC 1.0 exciter 116, the encoder 112, the IP source 114, and the 1.0 tuner 118.

The system 100 and associated methods may be used for application beyond the insertion of ATSC 3.0 audio/video information into ATSC 1.0 streams. The system 100 and associated methods may be used for other auxiliary data use cases of inserting ad assets/files, any relevant data files, content security keys and/or related information, and triggering signals that can be sent over broadcast, and may be implemented using techniques described herein.

Referring now to FIG. 5, an exemplary ATSC 1.0/3.0 hybrid stream 300 is shown. The ATSC 1.0/3.0 hybrid stream 300 may represent a number of packets transmitted in the 19.4 Mbps MPTS+STL data signal 134 in FIG. 4 and/or the data 19.4 Mbps MPTS+STLTP data signal 234 in FIG. 6 over a period of time. The ATSC 1.0/3.0 hybrid stream 300 can include a first ATSC 1.0 packet 302 (i.e., "Packet A"), a second ATSC 1.0 packet 304 (i.e., "Packet B"), a third ATSC 1.0 packet 306 (i.e., "Packet C"), and a fourth ATSC 1.0 packet 308 (i.e., "Packet D"). Each of the packets 302, 304, 306, 308 can include a PID field, a transport private data (TPD) flag, a payload field, a payload length field, a TPD payload field, and a TPD payload length field. The ATSC 1.0/3.0 hybrid stream 300 can be the modified ATSC 1.0 data stream output by the injection server 110 to the ATSC 1.0 exciter 116 in FIG. 3.

The first packet 302 can be associated with a first subchannel (i.e., "Subchannel 3.1"). The PID field can include a value corresponding to the first subchannel. The first packet 302 can include ATSC 1.0 content, and thus the TPD flag field can be set to zero. The payload field can include relevant ATSC 1.0 data that can be decoded to display video and/or audio. The payload length field can be set based on the size of the payload. The second packet 304 can be associated with the first subchannel. The PID field can include a value corresponding to the first subchannel. The second packet 304 can include ATSC 1.0 content, and thus the TPD flag field can be set to zero. The payload field can include relevant ATSC 1.0 data that can be decoded to display video and/or audio. The payload length field can be set based on the size of the payload. For example, the payload of the ATSC 3.0 packet, which may be up to 1500 bytes, may not be divisible into a whole number of packets, and one or more ATSC 1.0 packet payloads can be padded with zeros. In such an example, the payload length field can be set to indicate the number of bytes of the payload data that correspond to the ATSC 3.0 packet payload and the number of bytes of the payload data that do not correspond to the ATSC 3.0 packet payload (e.g., the number of bytes corresponding to zero padding). In some embodiments, the payload length field can be the transport private data length field.

The third packet 306 can be associated with a second subchannel (i.e., "Subchannel 3.2"). The PID field can include a value corresponding to the second subchannel. The third packet 306 can include ATSC 3.0 content, and thus the TPD flag field can be set to one. The TPD payload field can include relevant ATSC 3.0 data formatted in STLTP format that can be decoded to display video and/or audio. The TPD payload length field can be set based on the size of the payload. Relevant metadata that can be included in the CCL data and the BXF data can be included in header fields and/or in the TPD payload.

The fourth packet 308 can be associated with a third subchannel (i.e., "Subchannel 3.3"). The PID field can include a value corresponding to the third subchannel. The fourth packet 308 can include ATSC 3.0 content, and thus the TPD flag field can be set to one. The TPD payload field can include relevant ATSC 3.0 data formatted in STLTP format that can be decoded to display video and/or audio. The TPD payload length field can be set based on the size of the payload. Relevant metadata that can be included in the CCL data and the BXF data can be included in header fields and/or in the TPD payload.

Figure 5A:
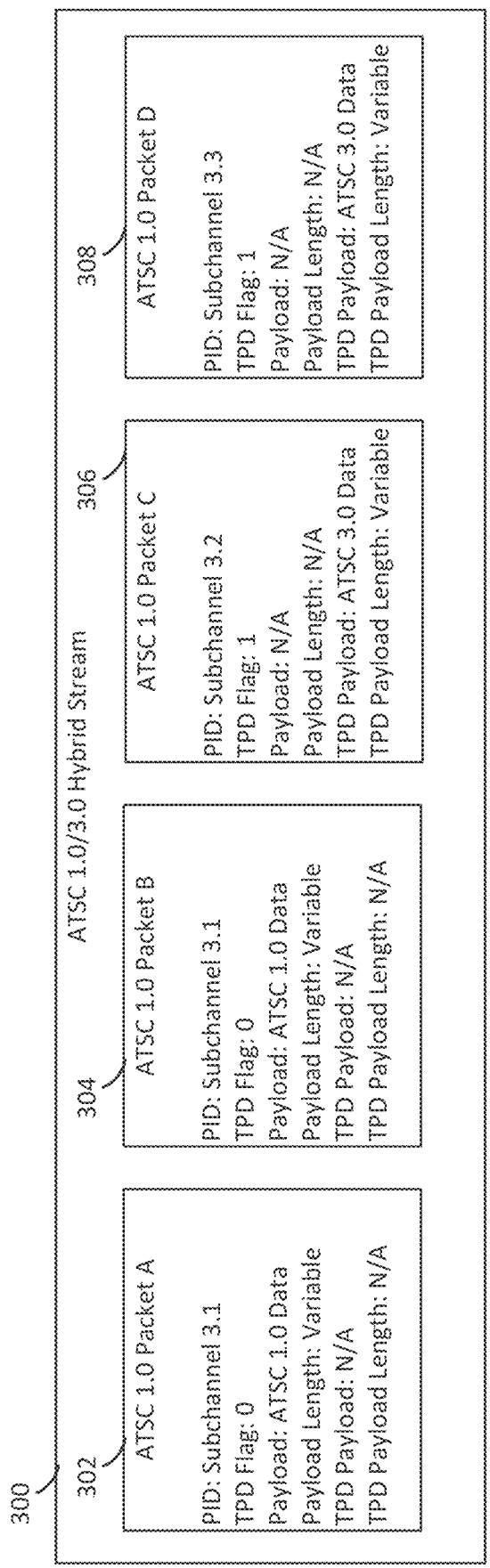
FIG. 5A shows an illustrative example of an ATSC 1.0/3.0 hybrid stream.
Figure 6:
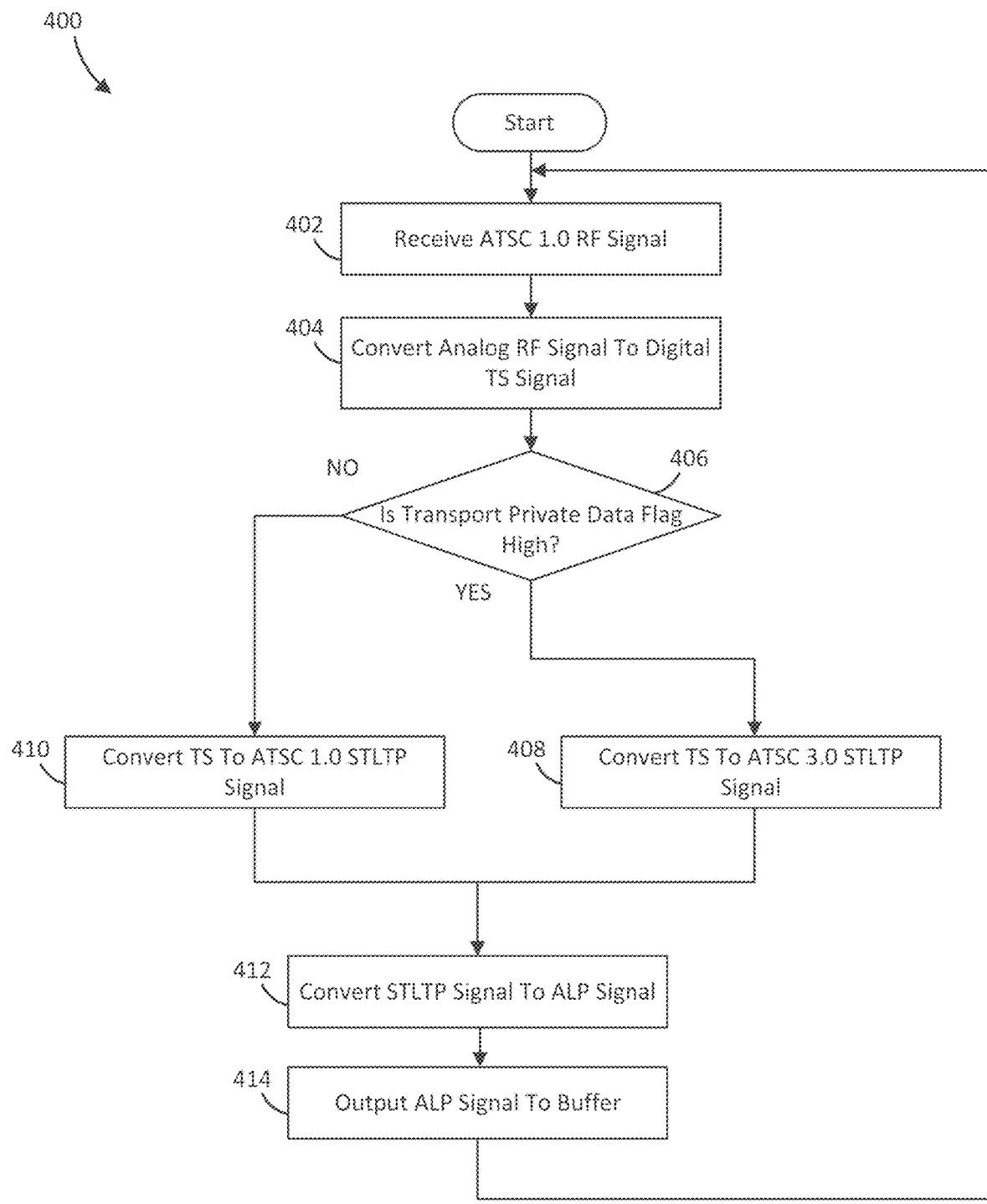
FIG. 6 shows a process for decoding an ATSC 1.0 RF signal.

In some embodiments, the metadata included in the modified ATSC 1.0 packets in FIG. 5A (e.g., packets 302-308) can include digital rights management data, non-real-time content delivery (NRT) data, hypertext transfer protocol (HTTP) enabled location delivery (HELD) data, advanced emergency information (AEA) data, wakeup data (e.g., wakeup bits), and/or xlinks data. Notably, xlinks is not standard on native ATSC 3.0 systems.

Referring now to FIG. 5B, an exemplary ATSC 1.0 packet 320 and a modified ATSC 1.0 packet 324 are shown. Both the ATSC 1.0 packet 320 and the modified ATSC 1.0 packet 324 can include a sync byte, a transport error indicator bit, a payload unit start indicator bit, a transport priority bit, a packet identifier field, a transport scrambling control bit field, an adaptation filed control field, and a continuity counter field. The ATSC 1.0 packet 320 can include a one hundred and eighty-four byte payload. The modified ATSC 1.0 packet 324 can include a payload counter field, a payload length field, and a one hundred and eighty-two byte payload. To be able to accommodate the data in each STLTP packet which is usually ~1500 bytes into several modified ATSC 1.0 data packets of 188 bytes, the payload counter and the payload length fields are used, thereby increasing the header by 2 bytes and reducing by the payload capacity to 182 bytes as compared to the ATSC 1.0 packet 320. Thus, 8-9 ATSC 1.0 packets can be used to transport the information in one ATSC 3.0 packet. The payload counter and the payload length fields help ensure all the data from STLTP packets are encapsulated without any loss of information. More details about ATSC 1.0 packet structure can be found in the ISO 13818-1 standard Referring now to FIGS. 2, 5A, and 5B, as well as FIG. 6, a process 400 for decoding an ATSC 1.0 RF signal is shown. The ATSC 1.0 RF signal can be the ATSC 1.0 hybrid RF signal 60 in FIG. 2. The process 400 can be executed by the receiver stack 117 in FIG. 3.

At 402, the process 400 can receive the ATSC 1.0 RF signal. The signal may be received using the ATSC 1.0 tuner 118 in FIG. 3. As noted above, the ATSC 1.0 RF signal can be the ATSC 1.0 hybrid RF signal 60 in FIG. 2. The ATSC 1.0 RF signal is an analog signal.

At 404, the process 400 can convert the analog ATSC 1.0 RF signal to a digital transport stream signal. The ATSC 1.0 RF signal can be converted to a transport stream signal using the ATSC 1.0 tuner 118 in FIG. 3. The ATSC 1.0 tuner 118 can include an analog-to-digital converter (ADC) configured to demodulate the ATSC 1.0 RF signal. The process 400 can provide the ATSC 1.0 RF signal after preprocessing and receive the digital transport stream signal. The digital transport stream can include a number of ATSC 1.0 packets, such as the first packet 302, the second packet 304, the third packet 306, and the fourth packet 308 described above. It is noted that whether a given packet in the stream includes ATSC 1.0 data or ATSC 3.0 data, each packet is formatted as an ATSC 1.0 packet.

At 406, the process 400 can determine, for each packet in the digital transport stream, whether or not the transport private data flag is high. Packets that include ATSC 3.0 content will have the transport private data flag set high (i.e., one). Packets that do not include ATSC 3.0 content (i.e., that only include ATSC 1.0 content) will have the transport private data flag set low (i.e., zero). For packets that the process 400 determines the transport private data flag is set high (e.g., "YES" at 406), the process 400 can proceed to 408. For packets that the process 400 determines the transport private data flag is set low (e.g., "NO" at 406), the process 400 can proceed to 410.

At 408, the process 400 can convert any ATSC 3.0 packets in the transport stream signal into one or more ATSC 3.0 STLTP signals. The number of ATSC 3.0 STLTP signals depends on how many ATSC 3.0 sub-channels are present in the transport stream signal. In some embodiments, the process 400 can determine what sub-channel a packet is associated with along with any relevant metadata (e.g., timing data) based on a number of fields in the header of the packet. For example, the sub-channel may be identified by a value in the PID field of the packet. The process can then generate the ATSC 3.0 STLTP signal by extracting the ATSC 3.0 content from the transport private data payload field using the metadata in the header. The ATSC 3.0 STLTP signal can be a "native" ATSC 3.0 STLTP signal that follows ATSC 3.0 STLTP protocol. In other words, a native ATSC 3.0 system could now process the ATSC 3.0 STLTP signal(s). In some embodiments, the process 400 can provide the TS signal to the TS to STLTP demuxer 120 and receive one or more ATSC 3.0 STLTP signals from the TS to STLTP demuxer 120. At 408, the process 400 can output the one or more ATSC 3.0 STLTP signals.

At 410, the process 400 can convert any ATSC 1.0 packets in the transport stream signal into one or more ATSC 1.0 signals. The number of ATSC 1.0 signals depends on how many ATSC 1.0 sub-channels are present in the transport stream signal. The process 400 can convert the ATSC 1.0 packets, which can be native ATSC 1.0 packets, into one or more ATSC 1.0 signals using standard ATSC 1.0 extraction and decompression protocol. At 410, the process 400 can output the one or more ATSC 1.0 signals.

At 412, the process 400 can convert any ATSC 3.0 STLTP signals and/or ATSC 1.0 signals output at steps 408 and 410, respectively, to ALP signals. In other words, the process 400 can convert the ATSC 3.0 STLTP signals and/or ATSC 1.0 signals into a stream of ALP packets. In some embodiments, the process 400 can provide the ATSC 3.0 STLTP signals and/or ATSC 1.0 signals to one or more PLP demuxers and receive one or more ALP streams from the one or more PLP demuxers. For example, the process 400 may provide the ATSC 3.0 STLTP signal(s) to the PLP demuxer 122 in FIG. 3 and receive the ALP signal(s).

At 414, the process 400 can output the ALP signal(s) generated at step 412 to a buffer. The buffer can be in communication with and/or included in a receiver device and/or a display device such as a television. The display device may output content based on the data included in the buffer.

Figure 7:
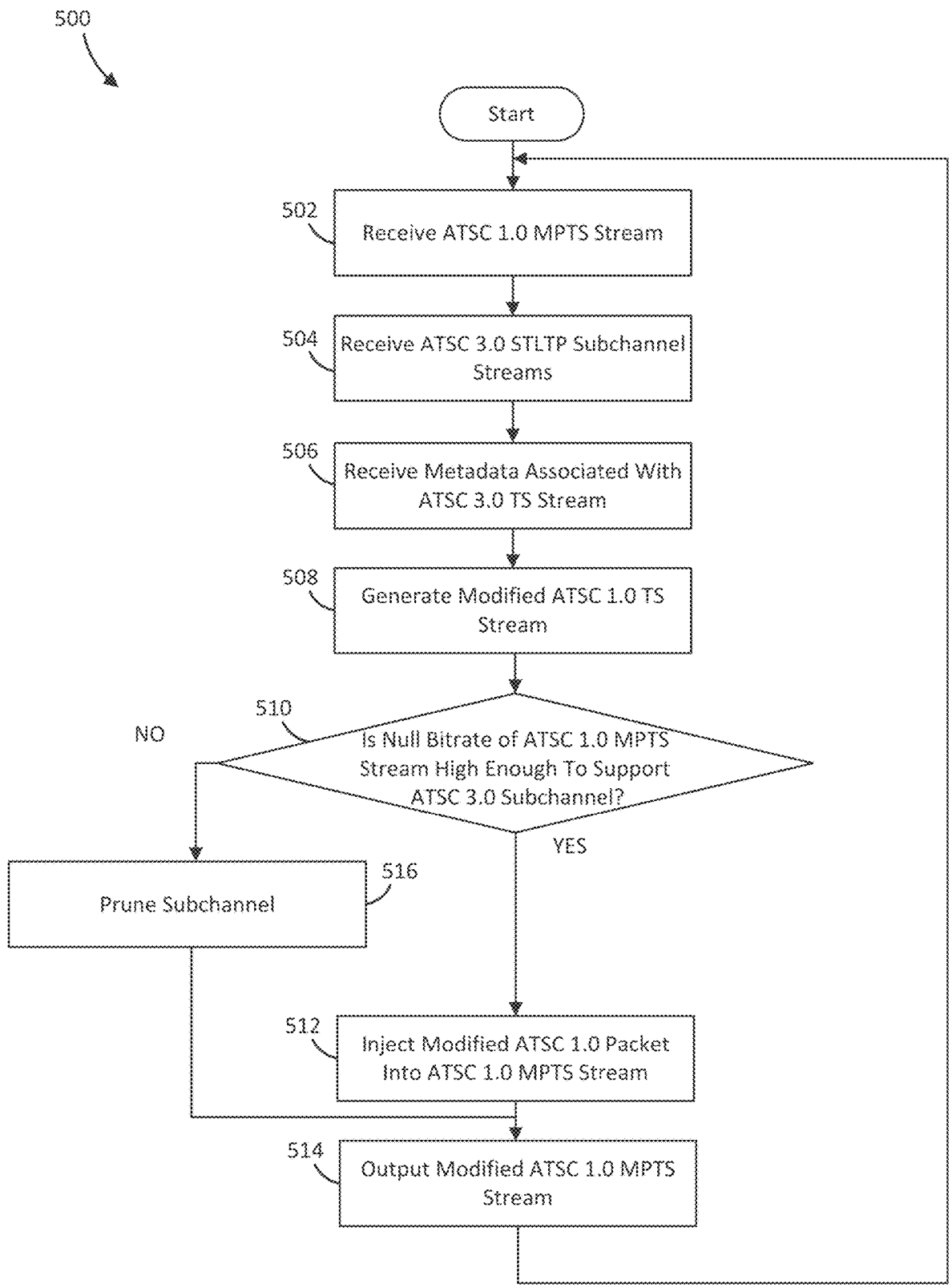
FIG. 7 shows a process for injecting ATSC 3.0 content into an ATSC 1.0 stream.

Referring now to FIG. 3 as well as FIG. 7, a process 500 for injecting ATSC 3.0 content into an ATSC 1.0 MPTS data stream is shown. The process 500 can be included in the injection application 109 and/or executed by the injection server 110. As described below, the process uses an opportunistic scheduling scheme to fit ATSC 3.0 content into available bandwidth (e.g., available packet payload space not occupied by ATSC 1.0 content) of the broadcast.

At 502, the process 500 can receive an ATSC 1.0 MPTS stream. In some embodiments, the process 500 can receive the ATSC 1.0 MPTS stream from the encoder 112. In some embodiments, the process 500 can receive the ATSC 1.0 MPTS stream from the IP source 114. At 504, the process 500 can receive a number of ATSC 3.0 chains (e.g., ATSC 3.0 chains 102, 104, and 106). Each ATSC 3.0 chain can include a stream of ATSC 3.0 packets. Each ATSC 3.0 chain can be associated with a subchannel (e.g., subchannel 3.2).

At 506, the process 500 can receive metadata associated with the ATSC 3.0 TS data stream. In some embodiments, the process 500 can receive metadata from the CCL data source 140 and the BXF data source 142.

At 508, the process 500 can generate a modified ATSC 1.0 TS data stream. In some embodiments, the process 500 can divide each ATSC 3.0 packet in an ATSC 3.0 chain into a number of smaller packets that can be included as the payload in an ATSC 1.0 packet. In some embodiments, the process 500 can divide each ATSC 3.0 packet into eight or nine portions. The process 500 can insert each portion into the payload portion of an ATSC 1.0 packet, populate a header section (e.g., PID and other fields) of the ATSC 1.0 packet based on the ATSC 3.0 packet, and set the transport private data flag of the ATSC 1.0 packet high. In some embodiments, the process 500 may populate the PID field of an ATSC 1.0 packet with the sub-channel identifier associated with an ATSC 3.0 packet in the ATSC 3.0 chain. The process 500 may populate the other header fields of the ATSC 1.0 packet with the metadata associated with the ATSC 3.0 packet. The process 500 can set the transport private data flag of the null packet high and populate the transport private data payload with a portion of the ATSC 3.0 packet. In some embodiments, the process 500 can provide the ATSC 3.0 chains to the multiplexer 108 and receive the modified ATSC 1.0 TS data stream from the multiplexer 108. In some embodiments, the process 500 can insert the metadata received at 506 into a payload of an ATSC 1.0 packet. In some embodiments, the process 500 can inject all ATSC 1.0 packets generated based on ATSC 3.0 packets into the modified ATSC 1.0 TS data stream. In some embodiments, the modified ATSC 1.0 TS data stream can be output to a buffer.

At 510, the process 500 can determine if the null bitrate of the ATSC 1.0 MPTS stream is high enough to support a ATSC 3.0 subchannel. Each packet in the modified ATSC 1.0 TS data stream can be associated with a subchannel. In some embodiments, the process 500 can compare the null bitrate of the ATSC 1.0 MPTS stream to a threshold, and if the null bitrate is above the threshold, determine that the ATSC 1.0 packet at the front of the modified ATSC 1.0 TS data stream can be inserted into the ATSC 1.0 MPTS stream. In some embodiments, the process 500 can compare the null bitrate of the ATSC 1.0 MPTS stream to a threshold, and if the null bitrate is not above the threshold, determine that the ATSC 1.0 packet at the front of the modified ATSC 1.0 TS data stream cannot be inserted into the ATSC 1.0 MPTS stream. In some embodiments, the process 500 can calculate the threshold to be the sum of the bitrate of the TS associated with the subchannel, the bitrate of any CCL data associated with the subchannel, and the bitrate of any private data associated with the subchannel. If the process 500 determines that the null bitrate of the ATSC 1.0 MPTS stream is high enough to support a ATSC 3.0 subchannel (e.g., "YES" at 310), the process 500 can proceed to 512. If the process 500 determines that the null bitrate of the ATSC 1.0 MPTS stream is not high enough to support a ATSC 3.0 subchannel (e.g., "NO" at 310), the process 500 can proceed to 516.

At 512, the process 500 can inject at least one packet included in the modified ATSC 1.0 TS data stream into the ATSC 1.0 MPTS stream. In some embodiments, the process 500 can inject a number of modified ATSC 1.0 packets associated with the same subchannel as the modified ATSC 1.0 packet at the front of the ATSC 1.0 TS data stream. In some embodiments, the process 500 can inject a number of modified ATSC 1.0 packets associated with the same subchannel as the modified ATSC 1.0 packet at the front of the buffer, and remove the injected packets from the buffer.

At 514, the process 500 can output a modified ATSC 1.0 stream including the ATSC 1.0 MPTS packets in the ATSC 1.0 MPTS stream received at 502, any modified ATSC 1.0 packets injected at 512, and any remaining null packets included in the ATSC 1.0 MPTS stream received at 502. In some embodiments, the process 500 can cause the modified ATSC 1.0 stream to be transmitted to the ATSC 1.0 exciter 116 at the ASI output 115.

At 516, the process 500 can prune a subchannel. In some embodiments, the process 500 can stop receiving (e.g., at 504) the ATSC 3.0 chain associated with the same subchannel as the modified ATSC 1.0 packet at the front of the ATSC 1.0 TS data stream. In some embodiments, the process 500 can stop receiving (e.g., at 504) the ATSC 3.0 chain associated with the same subchannel as the modified ATSC 1.0 packet at the front of the buffer.

Figure 8:
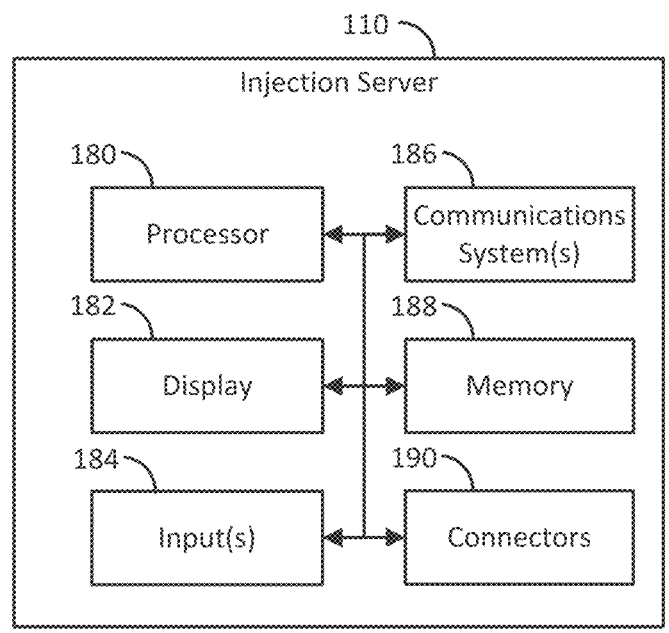
FIG. 8 shows a schematic diagram of exemplary hardware for an injection server.

FIG. 8 shows an example of hardware that can be used to implement an injection server 110 shown in FIG. 3 in accordance with some embodiments of the disclosed subject matter. As shown in FIG. 8, the injection server 110 can include a processor 180, a display 182, an input 184, a communication system 186, memory 188, and connectors 190. In some embodiments, the processor 144 can implement at least a portion of the injection application 109, which can, for example be executed from a program (e.g., saved and retrieved from memory 152). The processor 144 can be any suitable hardware processor or combination of processors, such as a central processing unit ("CPU"), a graphics processing unit ("GPU"), etc., which can execute a program, which can include the process 500 in FIG. 7.

As shown in FIG. 8, the injection server 110 can include a processor 180, a display 182, an input 184, a communication system 186, memory 188, and connectors 190. In some embodiments, the processor 180 can implement at least a portion of the remote trauma assessment application 134, which can, for example be executed from a program (e.g., saved and retrieved from memory 188). The processor 180 can be any suitable hardware processor or combination of processors, such as a central processing unit ("CPU"), a graphics processing unit ("GPU"), etc., which can execute a program, which can include the process 500 in FIG. 7.

In some embodiments, the display 182 can present a graphical user interface. In some embodiments, the display 182 can include any suitable display devices, such as a computer monitor, a touchscreen, a television, etc. In some embodiments, the inputs 184 of the injection server 110 can include indicators, sensors, actuatable buttons, a keyboard, a mouse, a graphical user interface, a touch-screen display, and the like. In some embodiments, the inputs 184 allow a user (e.g., a broadcaster) to interact with the injection server 110.

As shown in FIG. 8, the injection server 110 can include the communication system 186. The communication system 186 can include any suitable hardware, firmware, and/or software for communicating with the other systems, over any suitable communication networks. For example, the communication system 186 can include one or more transceivers, one or more communication chips and/or chip sets, etc. In a more particular example, communication system 186 can include hardware, firmware, and/or software that can be used to establish a coaxial connection (e.g., for an ASI interface), a fiber optic connection, an Ethernet connection, a USB connection, a Wi-Fi connection, a Bluetooth connection, a cellular connection, etc. The communication system 186 can also include any analog-to-digital converters and/or digital-to-analog converters to transmit and receive appropriate signals. In some embodiments, the connectors 190 can be wired connections, such as asynchronous serial interfaces (e.g., ASI inputs and/or outputs), IP inputs such as Ethernet interfaces, USB interfaces, etc.

In some embodiments, the memory 188 can include any suitable storage device or devices that can be used to store instructions, values, etc., that can be used, for example, by processor 180 to present content using display 182. Memory 188 can include any suitable volatile memory, non-volatile memory, storage, or any suitable combination thereof. For example, memory 188 can include RAM, ROM, EEPROM, one or more flash drives, one or more hard disks, one or more solid state drives, one or more optical drives, etc.

Example Consumer-Side Equipment and Integrations

Consumer-Side Hardware Configurations

Referring now to FIG. 9, several illustrative options for hardware implementations at a consumer location are shown. FIG. 9A shows a configuration 600 in which a separate set-top box receiver 602 is connected via a wired connection 606 (such as an HDMI or other connection) to a display device 604 (such as a flat screen television or computer monitor). The receiver 602 may comprise an internal tuner or may be connected to an external tuner (not shown) to receive a hybrid ATSC 1.0 signal. In one embodiment, the receiver 602 may comprise components 118-126 of FIG. 3. For example, the receiver 602 may be similar to a streaming device or stick that connects to a television.

In another alternative configuration 610, shown in FIG. 9B, a single display device 612 is shown. The functionality of a receiver 614 as disclosed herein is integrated into device 612, such that the device can receive and process hybrid ATSC 1.0/3.0 signals. In one configuration, the device 612 may rely upon a separate antenna/tuner device (not shown), in which case the device 612 would comprise internal hardware and/or software components 614 that receive, digitize, error check, separate (ATSC 1.0 vs. ATSC 3.0), convert, demultiplex, buffer, and perform such other functions as described above in order to display ATSC 1.0 and/or ATSC 3.0 on device 612.

In one implementation of aspects of the systems and methods disclosed herein, a client-side (software development kit) SDK may be made available to manufacturers of various devices so that they can effectively implement the parsing, demodulation, decoding, and other steps associated with recovering ATSC 3.0 or other content embedded in a native ATSC 1.0 transmission. For example, an SDK could be made available to allow a television manufacturer to install (or push over the air updates) new firmware within a television device to allow it to recognize ATSC 3.0 or other content embedded in the native ATSC 1.0 transmission as described herein. The television would not otherwise need new hardware and could continue to rely on a standard ATSC 1.0-based antenna and standard tuner. Alternatively, an app or other option could be made available in the operating system of a vehicle in-dash infotainment system that would add functionality to allow the vehicle to process a hybrid ATSC 1.0/3.0 signal and extract enhanced content (e.g., ATSC 3.0 content) from the hybrid ATSC 1.0/3.0 signal. In one embodiment, the SDK would permit television manufacturers to utilize library files or executable files onto their devices that would allow for identification and processing of enhanced content (e.g, ATSC 3.0 content, targeted file addressing (as described below), etc.) from the ATSC 1.0 transmission.

In yet another alternative configuration 620, shown in FIG. 9C a single receiver device 622 receives and processes a hybrid ATSC 1.0/3.0 signal for multiple display devices. Device 622 is connected to an antenna 624 by a first connection 626. Antenna 624 provides a hybrid ATSC 1.0/3.0 signal to receiver 622. In one embodiment, receiver 622 provides several separate wired connections 628-630 to multiple display devices 632, as well as wireless connections 634 to multiple display devices 636-638. For example, devices 636-638 could be a television, a computer, laptop, or table. In this respect, device 622 could operate like an internal hub for an office, retail establishment, restaurant, or home. In another embodiment, receiver 622 could be incorporated in a vehicle or other similar setting in which it could act as a local hub for multiple displays (e.g., a dash, seatback screen, tablet, phone, etc.).

In another alternative configuration 650, shown in FIG. 9D, a receiver 652 is shown as a central Internet and Television hub for a home 654. The receiver 652 is connected to a broadcast television antenna 656 as well as to an Internet service provider connection 658. In this way, receiver 652 may act as a router or communications hub for a home or other location. Receiver 652 can provide television service to devices within a home that combines broadcast ATSC 1.0 and ATSC 3.0 with cable, satellite, or other television services. Likewise, receiver 652 can provide such television services via a local wireless connection 662 as well as via Ethernet, HDMI or other wired connections 660 to various devices within the home 654.

Receiver Status Monitoring, Updating, and Data Collection

Figure 10:
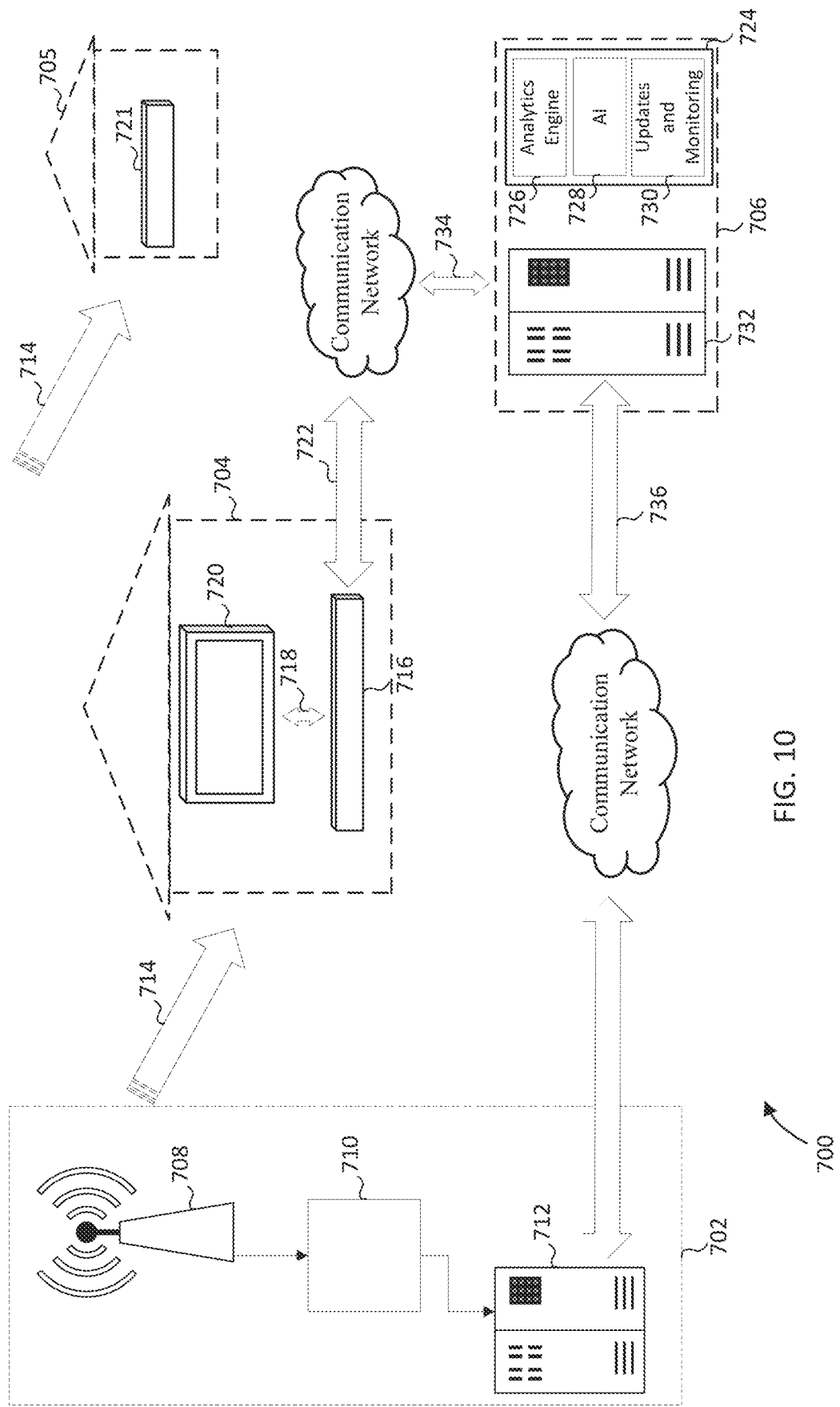
FIG. 10 is a diagram showing an example of transmission and data flow among a broadcaster, users, and optional data service.

Referring to FIG. 10, a system 700 is shown in which a broadcaster 702 transmits a hybrid ATSC 1.0/3.0 signal to a consumer's residence 704. A receiver 716 communicates via an Internet connection with a remote data and software service 706. In turn, the data and software service 706 communicates via an Internet connection with the broadcaster 702.

The broadcaster 702 operates an ATSC 1.0 exciter, such as a transmission tower or series of towers 708. As described herein the tower broadcasts using a typical 6 Mhz band, transmitting via the ATSC 1.0 protocol. However, the content of the broadcast may be partially or wholly ATSC 3.0 content. Thus, the broadcast station 702 comprises an injection server 710 that adds ATSC 3.0 content into the broadcast transmission 714. The hybrid transmission is received at local residences or other locations 704, some of which may process only ATSC 1.0 content and some of which may process both ATSC 1.0 and ATSC 3.0 content.

At a first location 704, the receiver 716 receives the hybrid transmission 714. In one embodiment, the receiver is capable of processing hybrid ATSC 1.0/3.0 content as described above, and so digitizes transmission 714, and demodulates/decodes/processes the ATSC 1.0 and ATSC 3.0 content for presentation to a display device 720. While shown as a separate device, receiver 716 could instead be implemented as any of the configurations described above. At a second location 705, a user has simply a standard display device 721 that does not have a receiver device or software that allows it to process any ATSC 3.0 content from broadcast transmission 714. Thus, display 721 only processes the packets from transmission 714 that are traditional ATSC 1.0, and ignores or does not process content flagged as private data (or which are otherwise flagged as not being an ATSC 1.0 content or flagged as being ATSC 3.0 content).

At the first location 704, a user viewing display device 720 would thus have the option to select from among one or more "channels" from transmission 714 that are ATSC 1.0 content, one or more "channels" from transmission 714 that are ATSC 3.0 content, and any other broadcast channel which is sent via the ATSC 1.0 protocol. In one alternative, receiver 716 could log and monitor various types of information about viewing activity of device 720 (or, if receiver is a hub, multiple display devices, tablets, etc. within the same home, office, arena, restaurant, apartment, or other locality). The types of information could include:

Total weekly or daily time spent viewing television programming

Total weekly or daily time spent viewing broadcast television programming versus cable, streaming, gaming, BlueRay, or other sources Average time(s) of day at which broadcast television programming is viewed, by day Tracking of which types of devices account for most viewing of broadcast television (large screen displays, phones, tablets, computers, etc.)

Average number of simultaneous devices viewing broadcast television content

Specific tracking of which channels and/or specific programs are viewed on which devices, and for how long.

Various indications of user responses to enhanced content (e.g., targeted local advertisements, local weather, local traffic, local alerts), such as changing the channel or turning off the device upon a certain type of content being displayed The device 716 of FIG. 10 could be configured to transmit some or all of this information via an Internet connection 722 to a remote data service 706. The remote data service 706 could be a separate third party data processing company, the manufacturer of device 706, an automated virtual cloud-based service, or a system belonging to broadcaster 702. The data service 706 can include a large scale database or data lake 732 that could aggregate data sent from each device 716 in a highly organized way. For example, the data for each device could be clustered, organized, and searchable by a variety of attributes. To aid organization of data, each device could be associated with specific data regarding its locality and users. For example, during an initial set up of device 716 at a residential location, users could be asked to create one or more user accounts for the various users at the home. The accounts could store basic demographic and locality information, such as address, number of individuals in the household, ages of each individual or other similar information. These demographics could be further used to organize the data in the database 732.

In addition, the data service 706 of FIG. 10 could utilize the database 732 to provide a number of services. For example, a data analytics service 726 could be provided. The data analytics service 726 could be utilized to provide numerous types of analyses for one or more broadcasters 702, such as: viewership of the station's channels by program, date, type of device, etc.; demographics of viewership; analyses of how long various programs are viewed and when a user turns off programming; etc. For example, the analytics engine 726 could be configured to allow a broadcaster 702 to perform real time custom queries of data regarding its programming, to receive regular or daily reports of viewership of its programming, or to know what demographics of its viewership are receiving which advertisements.

As another example of services that could be provided by data service 706 of FIG. 10, various artificial intelligence services 728 could be provided. Given the potential volume of data that could be collected in database 732, sufficient case and control data would exist to train and update neural network models or other forms of machine learning to make various predictions. For example, predictions of future viewership for particular times of day, on specific dates, by demographic could be generated based on past data. In one embodiment, a recurrent neural network could be used to predict future viewing habits for users within a specific demographic or geography, based on the sequence of past viewing history for that group. In another embodiment, a prediction could be made as to a new user's likely viewing preferences based on input demographic information and/or some initial viewing data. Or, a prediction could be made of the likelihood that a given category of content at a given time of day would be successful for a given locality within the broadcast range of broadcaster 702.

Another service that could be provided by data service 706 is two-way communication 734 with devices 716. In other words, in addition to obtaining usage data from a device 716, the data service could also push out files and data 734 back to the device 716. For example, the data service 706 could optionally communicate with the device 716 so as to request periodic status checks, assess health of the device, determine when it is shut off or malfunctioning, and send software/firmware updates and upgrades. Or, the data service could push targeted advertisements or other user-specific content to device 716 to be combined with or displayed in conjunction with the content from hybrid transmission 714. In one embodiment, receiver 716 could be configured to supplement the content or transmissions from broadcaster 702, such as by adding the appearance of additional subchannels from the broadcaster. Or, live weather or traffic data from data service 706 could be inserted into a frame surrounding programming content from broadcaster 702.

In other configurations, a database 712 of the broadcaster can be populated with information regarding users and their demographics and preferences. The data for this database could be provided by the data service 706 via a connection 736 to the data service. Additionally or alternatively, data for this database could be provided directly to broadcaster 702 from device 716 or from an online user "registration" process. For example, broadcasters could invite users to "register" with the broadcaster so that their experience can be customized with more targeted offerings through the hybrid stream 714. In one implementation, users could provide the broadcaster's database 712 with addresses, ages, interests, etc. as well as a unique identifier associated with device 716. This information could be leveraged by a broadcaster to allow its advertising partners to target specific types of users, or to deliver customized traffic or weather data to the user.

Targeted File Addressing and Data Transfer

Various embodiments of the systems and methods disclosed herein could be leveraged so as to allow broadcasters of hybrid ATSC 1.0/3.0 transmissions to transfer files and content only to targeted groups or even individual devices. Referring again to FIG. 10, each receiver device 716 within range of a given broadcaster could have a set of instructions (E.g., software/firmware) stored on its memory that would modify how it processes incoming ATSC 3.0 content from an ATSC 1.0 transmission 714. In one sense, the receiver 716 could be assigned a set of attributes, or a set of categorizations that would be used as a "filter" to help the device either ignore or accept data packets, files, or ATSC 3.0 content from the transmission 714. In one implementation, the device could first identify whether a given data packet of transmission 714 has the private data flag set. If so, the receiver 716 could then look to the first few bits of a data packet to determine total payload size, payload counter, as well as one or more payload recipient attributes. For example, the attributes might correspond to: a zip code, county, or other locality; the type of venue in which the receiver is situated (e.g., residential home, restaurant/bar/coffee shop, office, vehicle, etc.); age or other demographics of users; or other attributes. The receiver 716 would use a software-based logic filter that "accepts" transmissions having attribute codes that match one or more attributes of the receiver 716. For example, during initial setup of receiver 716 or at a later time, the receiver would have a series of settings or attributes defined for the receiver. These could be sent from the data service 706 or input by the user through a U/I displayed on the user's display connected to the receiver (e.g., the receiver would guide the user through a set up process using a connected display; or an app could be downloaded on a mobile device to accomplish the same). The attribute settings would be used to seed the logic filter. Thus, when a data packet of transmission 714 is received, the receiver 716 would accept and process the packet if one, some or all of the payload attributes match one, some, or all of the attribute settings of the device. In this manner, files, content, or data of a general over-the-air broadcast can be targeted to certain users/devices and not others.

Another option that could be implemented in addition to or instead of the attribute-based payload filtering is individual device addressing. In this embodiment, each receiver would be given a unique ID. This could be done via the data service 706, at initial user setup, or by a manufacturer. Then, a broadcaster (or multiple broadcasters) could implement a form of packet addressing, so as to address data packets specifically to individual receivers. For example, each packet of a hybrid transmission in which the private data flag is set could include header bits that correspond to the unique ID (or a set of unique IDs) of individual receivers 716. Any receivers that do not have a corresponding ID would simply ignore or discard the associated payload.

With individual file addressing and/or attribute filtering, broadcasters could maximize bandwidth during peak viewing hours by sending certain content in advance, to be stored on certain receivers. In one example, a set of targeted local advertisements, images, audio, narrations, short videos, animations, data (e.g., weather), or other content could be broadcast using a small portion of available bandwidth (e.g., using opportunistic scheduling) during off-peak times to targeted users, or using a large portion of available bandwidth during night hours when the station is not typically broadcasting some or all of its subchannels. The advertisements, images, etc. could then be stored in a memory of applicable receivers 716. Later, during various viewing times, the broadcaster could use control data (such as CCL data) to instruct the receiver 716 to insert such content the user's display, or to make it available upon user request (e.g., a user in a vehicle switching to a weather channel). Thus, during regular broadcast hours, broadcasters could utilize a greater portion of their bandwidth to broadcast, e.g., more HD or 4K content because some advertisements were already sent in advance. For example, in some embodiments files containing commercial advertisements could be sent in advance and stored on receiver 716 for one or a number of broadcasters (e.g., sent at night when regular programming is not being broadcast). Then, during certain peak viewing times (or during commuting times, for devices implemented in vehicles), broadcasters could send programming at a comparatively high bitrate, then when the time came to display commercial advertisements, the broadcasters could simply instruct (e.g., via CCL data or another command) receivers to play a series of stored advertisements. While those advertisements are playing, the broadcaster could continue transmitting the programming so that the receiver can buffer it. Then, when the advertisements conclude, the receiver could resume playing the programming which would have a sufficient buffering. In this way, broadcasters could effectively increase potential bandwidth, or in other words could play higher bitrate content in less available bandwidth.

Example Applications for Hybrid Transmission in Networks, Systems and Services

Virtual Interoperability Testing

Interoperability testing is an important, but resource intensive process undertaken by a broadcast segment (e.g., television broadcasting, radio broadcasting, local/private broadcasts, etc.), that is undertaken when a broadcast standard is to be changed (e.g., from analog to digital television broadcasting, or from various versions of broadcast standards). Often, interoperability testing is undertaken as a collective effort by various participating manufacturers, broadcasters, service providers, and organizations, with an aim of ensuring that the ecosystem (endpoint technology, broadcast technology, transmission and reception protocols, decoding, content, emergency systems, etc.) is ready for the broadcast update and will be largely error-free once launched for users. However, for true "real world" testing to take place, a broadcaster must start dedicating at least a portion of its transmission band to broadcasting under the new standard (whether by converting an existing broadcast to a new transmission protocol, or investing in new transmission equipment, or both). This is a severe limitation on how much testing can take place, and how long the needed testing takes to complete. However, a "virtual" interoperability testing can be implemented using the hybrid transmission schemes set forth above. For example, a set of ATSC 3.0 test files (e.g., in the form of IP-capture (PCAP) files, sometimes referred to herein as PCAPs) can be created at a hub or "host" broadcast station, and transferred to interested (Spoke) stations or centers across the world, which can then use the PCAPs to recreate the test environment in their own organizations and labs, leveraging file transfer push and receive capabilities as described above.

In one implementation, a host broadcast station utilizes a portion of its bandwidth to broadcast "hidden" ATSC 3.0 or other information and content under a different or "new" broadcast protocol. The station and/or a receiver generates PCAP files to record packet data. Then, test-stage devices (such as televisions, set-top boxes, car receivers, etc.) within broadcast range of the hub can receive the information and content so that manufacturers can assess whether the devices are operable with the new type of broadcast format. For example, a manufacturer of a television that includes a receiver and software to decode a hybrid signal can assess whether the television is playing the correct content given the test content intended to be sent. Next, the host station can push the test content and/or PCAP files to receivers at spoke stations (e.g., by injecting packets reflecting the same into a broadcast transmission, as described above), so that those stations can then utilize the content and/or PCAP information recreate the same test transmission using a portion of their respective bandwidth, for the same or different devices to receive the test transmission so that the manufacturers can assess interoperability. In one embodiment, a spoke station is able to completely recreate the exact signal transmission generated by the host station.

Similarly, signal recreation could be performed for radio frequency (RF) signals—in other words an RF signal produced at one location could be completely recreated as is at another location (either within broadcast range of the first location, or anywhere in the world via an IP transmission). For example, in some embodiments, the service described above could be used in tandem with an interoperability service. A broadcast chain service could provide files in the form of RF captures and transfer the RF files from a hub station to spoke stations. The transfer could be done by the hub station injecting the RF files into packets of its broadcast transmission in addition to or in lieu of ATSC 3.0 content (as described above), or via a cloud service to spokes anywhere in the world by leveraging file transfer push and receive capabilities described above. The files can be used to recreate a test environment by recreating the exact RF signal of the host station, to allow for interoperability testing to be done by a manufacturer (E.g., of a receiver set) at the manufacturer's own location.

Conformance Testing

Similarly, as new broadcast standards or methodologies are implemented, conformance testing at scale across a wide variety of devices becomes important for manufacturers, industry and standard setting organizations, and broadcasters. A hybrid transmission scheme, as described above, can be leveraged to easily support such testing. For example, an analytics agent can be embedded in televisions and other receiver devices across applications and content types. These receivers are thus able to provide information about their operation to a data lake or other data repository, as described above. The information may include the as—decoded content stream, any identified issues with packet decoding, issues with playback such as (in)ability for an onboard processor of the receiver to keep up with decoding the separate, multiple channels of the hybrid transmission, (in)ability of a device to switch between ATSC 1.0 and ATSC 3.0 content, (in)ability to inject custom advertisements, connection problems with remote services, etc. Similarly, information on user familiarity, aptitude, and popularity with respect to updates to user interfaces can be obtained. Rich insights and report generation is then possible from the gathered data which can be used by other industry recognized conformance testing agencies. And, as noted above, the service provides the ability to pick and choose different devices from various locations to be part of this conformance testing.

3.0 BROADCAST Chain as a Service and Signal Repeat Sharing

In some embodiments, a television frequency broadcast, a radio frequency broadcast, other public broadcasts, or combinations thereof can be combined into a single ATSC broadcast. For example, a "host" television broadcast tower can inject files representing content of one or more local radio broadcasts into available "private" bandwidth (in the examples above, this would be in place of some or all ATSC 3.0 content) of its ATSC 1.0 broadcast at television frequency. A spoke station (this could be a television or radio broadcaster) could have installed a receiver device (as described above) that receives, separates, and decodes the injected radio broadcast, then re-transmits the broadcast from the spoke station's broadcast equipment. Software in appropriate hybrid receivers at a user's location can decode the content, determine from associated metadata that it is a repeat of another broadcast, compare the repeated broadcast to the native broadcast, and playback to the user the broadcast version with the better fidelity, stability, etc.

In yet further embodiments, a hub station or third party service may operate an ATSC 3.0 broadcast chain. Often, operating an ATSC 3.0 broadcast chain can require several different types of equipment and functions, such as an ATSC 3.0 transport stream encoder, various packagers and encoders, and a broadcast gateway/scheduler. However, a broadcast station that transmits in a native ATSC 1.0 format may not have or wish to obtain the appropriate 3.0 chain to be able to offer ATSC 3.0 content. Therefore, the hub station or third party can broadcast or otherwise transmit (e.g., via an IP or cloud connection) post-chain ATSC 3.0 content to be injected into the spoke station's ATSC 1.0 transmission as described above. Thus, ATSC 3.0 broadcast chain services can be provided via the systems and methods described herein.

Dashboard Services

Figure 11:
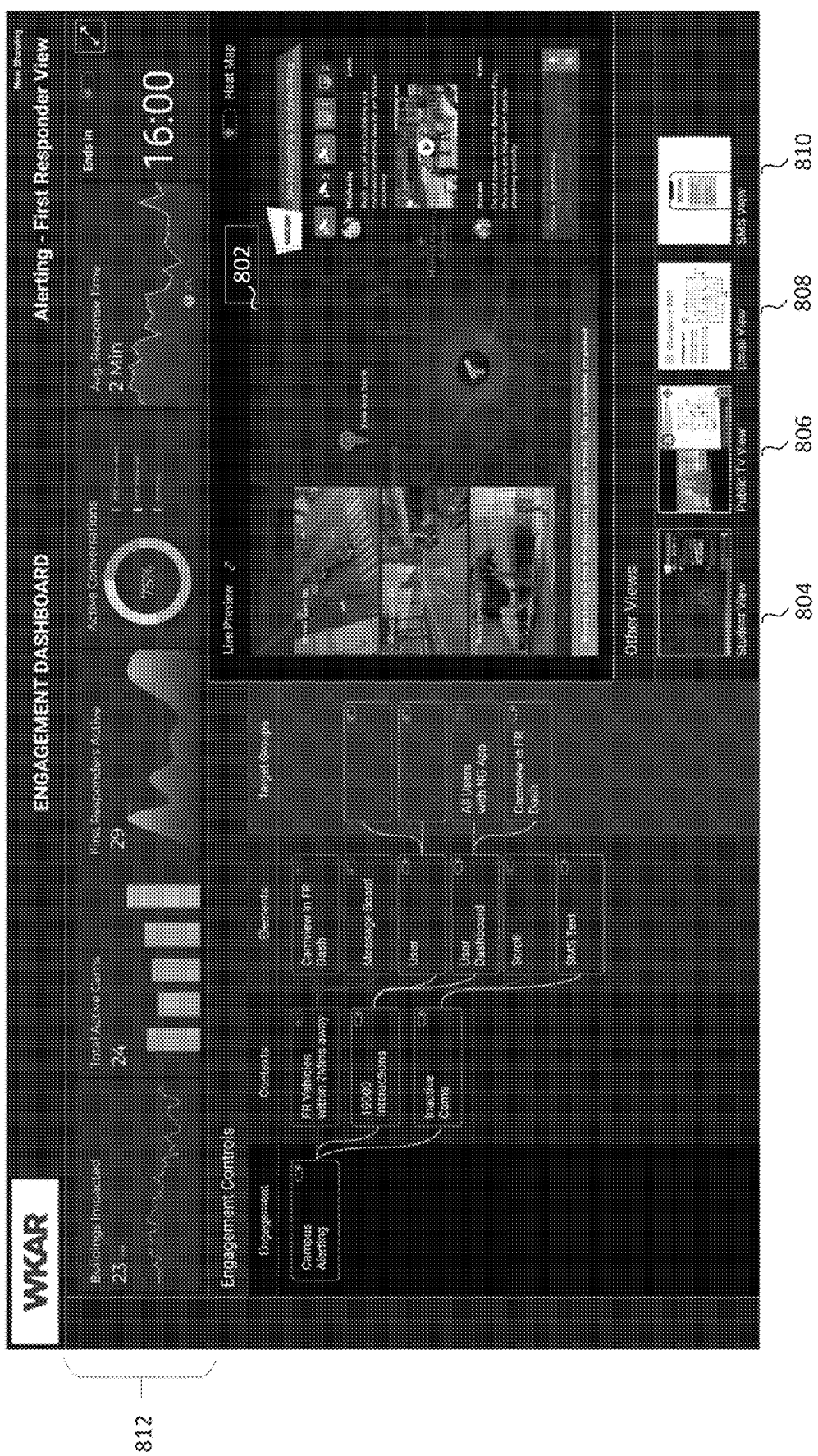
FIG. 11 is a depiction of an example dashboard through which a station or third party vendor can control and monitor content delivery to various audiences and receivers.
Figure 12:
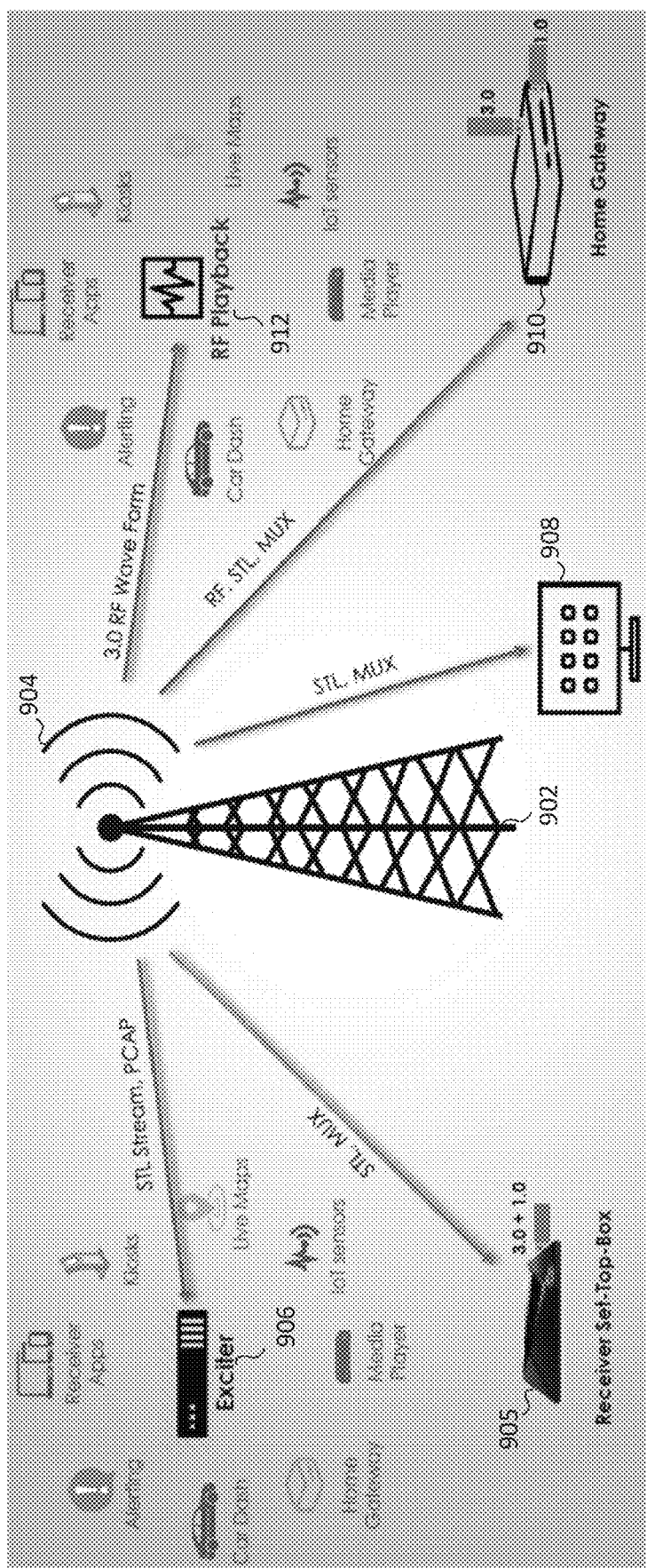
FIG. 12 is a diagram showing various alternative configurations and systems that make utilize a hybrid signal transmission as described herein.

Referring now to FIG. 11, a Dashboard screen 800 may be provided for a broadcast station to help leverage the functionalities available through the hybrid transmission systems and methods described herein. In one embodiment, the dashboard is provided by a set of software instructions stored on a memory associated with one or more processors or services of the station. In another embodiment, the dashboard is provided as part of a service offering, in which a remote server hosts the dashboard and, according to user input, provides an ATSC 3.0 stream of content to an injection server of the station for broadcast in accordance with the above methods. As can be seen, several views are available, including a First Responder View 802, Student View 804, Public TV View 806, Email View 808, and SMS View 810. In yet another embodiment, the dashboard view for First Responders is provided to and operated by a First Responder agency (such as a police department), as well as, optionally, the Email View and SMS View for emergency alerts. In such an embodiment, the "Student View" could be provided to and operated by a school district and/or higher education institution, and the "Public TV View" could be provided to and operated by a public television broadcaster. In this way, a station's transmission bandwidth could be utilized by more parties than simply the TV station itself.

In the Figure shown, First Responder View 802 is selected. In an info band 812 across the top of the dashboard, various statistics relating to local first responders and crises (e.g., within the designated market area for this broadcaster) are shown. In the Figure, an incident involving a police response is occurring. The dashboard receives information from first responders regarding where the incident is taking place, and so can assess how many buildings/dwellings in the nearby area that have hybrid receiver capabilities are impacted. If needed, the broadcaster can send emergency alerts over the ATSC 1.0 broadcast to those devices. To do so, a station or other user (such as a Police Department) could toggle to the Email View or SMS View to initiate an associated email blast or public SMS relating to the emergency at hand.

In the "Live Preview" pane 802, a broadcast is shown relating to the incident. The broadcast includes footage from associated traffic and police body cams, as well as related social media engagement. Traffic cam and body cam footage may be made available via an IP connection from a police headquarters, municipality, or other organization (e.g., shopping malls, parking garages, etc.). The Dashboard may permit the station or other user to select the feeds most relevant to a crisis at hand. This broadcast may be intended for first responder receivers, and in this sense the transmitted packets can include tags, encryption of packet content, or other metadata that cause the packets to only be decoded by receivers associated with first responders. For example, the "Live Preview" could be displayed in a patrol car, ambulance, or other first responder locations. In other embodiments, the First Responder broadcast could be intended for and displayed to all users within the local area, just to the devices most impacted by the incident, or could simply be an available channel for users to select.

What is claimed is:

1. A receiver comprising:
   an input connected to receive a television broadcast signal;
   an output configured to be connected to a display;
   a processor connected to receive the television broadcast signal from the input, and further connected to a memory having stored thereon a set of software instructions which, when executed by the processor, cause the processor to:
   digitize the television broadcast signal into packets;
   determine whether each packet contains an indicator of a television content type not native to the television broadcast signal;
   if such an indicator is not present, process the packet using a first decoding scheme for rendering as the native television content type;
   if such an indicator is present for a packet, process the packet using a second decoding scheme for rendering as a second television content type; and
   present the native television content and second television content type to the output for display as television channels.

2. The method of claim 1, wherein the television broadcast signal is an ATSC 1.0 signal, and the native television content type is ATSC 1.0 content.

3. The method of claim 1 wherein the instructions further cause the processor to store the second television content type for future display to users when an instruction is received to do so via the television broadcast signal.

4. The method of claim 1 wherein the instructions further cause the processor to combine at least a portion of the second television content type into a rendering of the native television content such that both types of content are displayed to a user as a single television channel.

5. A method for receiving enhanced multimedia signals, comprising:
   receiving, at a hardware device, an advanced television systems committee (ATSC) 1.0 broadcast comprising a plurality of ATSC 1.0 packets;
   determining for each of the plurality of ATSC 1.0 packets whether the respective ATSC 1.0 packet is to be rendered as ATSC 1.0 content;
   identifying a plurality of modified ATSC 1.0 packets included in the broadcast that are not to be rendered as ATSC 1.0 content, wherein each of the plurality of modified ATSC 1.0 packets comprises:
      at least a portion of a packet representing non-ATSC 1.0 content; and
      an indicator that the modified ATSC 1.0 packet is not to be rendered as ATSC 1.0 content;
   converting at least a portion of the plurality of modified ATSC 1.0 packets to a signal comprising non-ATSC 1.0 content; and
   cause the non-ATSC 1.0 content to be rendered upon user request.

6. The method of claim 5, further comprising:
   identifying a plurality of unmodified ATSC 1.0 packets included in the broadcast for which the indicator indicates that the respective ATSC 1.0 packet is to be rendered as ATSC 1.0 content,
      wherein each of the plurality of modified ATSC 1.0 packets includes a payload having no more than 182 bytes, and
      wherein each of the plurality of unmodified ATSC 1.0 packets includes a payload having at least more than 183 bytes.

7. The method of claim 5, further comprising:
   identifying metadata associated with each of the plurality of modified ATSC 1.0 packets;
   determining, based on the metadata, that a subset of the plurality of modified ATSC 1.0 packets corresponds to a particular ATSC 3.0 packet;
   generating an ATSC 3.0 payload based on the subset of the plurality of modified ATSC 1.0 packets corresponding to the particular ATSC 3.0 packet; and
   generating an ATSC 3.0 signal using the ATSC 3.0 payload.

8. The method of claim 7, wherein the metadata associated with each modified ATSC 1.0 packet of the plurality of modified ATSC 1.0 packets comprises:

a packet identifier (PID) indicative of an ASTC 3.0 subchannel associated with the particular ATSC 3.0 packet.

9. The method of claim 5, wherein each of the plurality of modified ATSC 1.0 packets comprises:
a payload recipient attribute field.

10. The method of claim 9, wherein the payload recipient attribute field is indicative of a property associated with one or more target recipients of the modified ATSC 1.0 packet.

11. The method of claim 10, wherein the payload recipient attribute field comprises information indicative of a geographic location associated with the one or more target recipients.

12. The method of claim 11, wherein the payload recipient attribute field comprises information indicative of a type of venue associated with the one or more target recipients.

13. The method of claim 11, wherein the payload recipient attribute field comprises information indicative of identifying information of one or more devices associated with the one or more target recipients.

14. The method of claim 11, further comprising:
comparing the property associated with one or more target recipients to a stored value indicative of a property associated with the hardware device; and
determining that the hardware device is an intended recipient based on the comparison.

* * * * *